(12) United States Patent
Hu et al.

(10) Patent No.: US 11,303,892 B2
(45) Date of Patent: Apr. 12, 2022

(54) ADAPTIVE ROUNDING FOR LOOP FILTERS

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/153,512

(22) Filed: Jan. 20, 2021

(65) Prior Publication Data

US 2021/0235078 A1   Jul. 29, 2021

Related U.S. Application Data

(60) Provisional application No. 62/965,147, filed on Jan. 23, 2020.

(51) Int. Cl.

| *H04N 19/00* | (2014.01) |
| *H04N 19/117* | (2014.01) |
| *H04N 19/82* | (2014.01) |
| *H04N 19/176* | (2014.01) |
| *H04N 19/186* | (2014.01) |
| *H04N 19/132* | (2014.01) |

(52) U.S. Cl.
CPC ......... *H04N 19/117* (2014.11); *H04N 19/132* (2014.11); *H04N 19/176* (2014.11); *H04N 19/186* (2014.11); *H04N 19/82* (2014.11)

(58) Field of Classification Search
CPC .. H04N 19/117; H04N 19/132; H04N 19/176; H04N 19/186; H04N 19/82
See application file for complete search history.

(56) References Cited

U.S. PATENT DOCUMENTS

| 2011/0200108 A1* | 8/2011 | Joshi ................... H04N 19/61 375/240.16 |
| 2020/0244998 A1* | 7/2020 | Gisquet ............... H04N 19/117 |

OTHER PUBLICATIONS

Bross B., et al., "Versatile Video coding (Draft 8)", Joint Video Experts Team (JVET) of ITU-T SG 16 WP 3 and ISO/IEC JTC 1/SC 29/WG 11, 17th Meeting: Brussels, BE, Jan. 7, 2020-Jan. 17, 2020, Document: JVET-Q2001-vE, No. JVET-Q2001; m52905, Jan. 22, 2020 (Jan. 22, 2020), XP030224288, 515 pages, Retrieved from the Internet: URL: http://phenix.int-evry.fr/jvet/doc_end_user/documents/17_Brussels/wg11/JVET-Q2001-v9.zip JVET-Q2001-v9.docx [retrieved on Jan. 22, 2020] section "7.3.2.3 Sequence parameter set RBSP syntax", sections 8.8.5.2 and 8.8.5.4 tables 45, 46 equations 1502-1504 equations 1461-1463.

(Continued)

*Primary Examiner* — Zhihan Zhou
(74) *Attorney, Agent, or Firm* — Polsinelli LLP

(57) ABSTRACT

Systems, methods, and media are provided for video coding, including loop filtering. One example includes obtaining the video data comprising one or more pictures and determining a sample of the one or more pictures to be filtered using a loop filter. A shift variable associated with the sample is determined, and a rounding value is selected based on the shift variable. A modified sample is generated, the modified sample being generated at least in part by modifying a value of the sample using one or more filter coefficients, one or more clipping values of the loop filter, the rounding value, and the shift variable. The modified sample is then output.

30 Claims, 14 Drawing Sheets

(56) References Cited

OTHER PUBLICATIONS

International Search Report and Written Opinion—PCT/US2021/014385—ISA/EPO—dated Apr. 12, 2021.
Zhang (Ericsson) Z., et al., "CE5-Related: On the CC-ALF Filtering Process" 17, JVET Meeting; Jan. 7, 2020-Jan. 17, 2020; Brussels; (The Joint Video Exploration Team of ISO/IEC JTC1/SC29/WG11 and ITU-T SG.16), No. JVET-Q0165, m51754, Dec. 28, 2019 (Dec. 28, 2019), XP030222749, 7 pages, Retrieved from the Internet: URL: http://phenix.int-evry.fr/jvet/doc_end_user/documents/17_Brussels/wg11/JVET-Q0165-v1.zip JVET-Q0165-v1/JVET-Q0165-v1.docx [retrieved on Dec. 28, 2019], section 1 equation 1.

* cited by examiner

|  | 707 f3 | 716 f6 |  |
|---|---|---|---|
| 702 f0 | 706 f2 | 714 f5 | 722 f7 |
|  | 704 f1 | 712 f4 |  |

ADAPTIVE ROUNDING FOR LOOP FILTERS

CROSS-REFERENCE TO RELATED APPLICATIONS

This application claims the benefit of U.S. Provisional Application No. 62/965,147, filed Jan. 23, 2020, which is hereby incorporated by reference, in its entirety and for all purposes.

TECHNICAL FIELD

The present disclosure generally relates to video coding. More specifically, this application relates to systems, methods, and computer-readable media for providing adaptive rounding for loop filters of one or more coding devices, such as adaptive loop filters (ALF) and cross component adaptive loop filters (CC-ALF).

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), moving picture experts group (MPEG) coding, VP9, Alliance of Open Media (AOMedia) Video 1 (AV1), among others. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Disclosed are systems, apparatuses, methods, computer-readable media, and other examples adaptive rounding for loop filters. In one illustrative aspect, an apparatus is provided. The apparatus comprises memory; and one or more processors coupled to the memory, the one or more processors being configured to: obtain video data comprising one or more pictures; determine a sample of the one or more pictures to be filtered using a loop filter; determine a shift variable associated with the sample; select a rounding value based on the shift variable; generate a modified sample, the modified sample being generated at least in part by modifying a value of the sample using one or more filter coefficients, one or more clipping values of the loop filter, the rounding value, and the shift variable; and output the modified sample.

In another illustrative aspect, a method of processing video data is provided. The method comprises obtaining the video data comprising one or more pictures; determining a sample of the one or more pictures to be filtered using a loop filter; determining a shift variable associated with the sample; selecting a rounding value based on the shift variable; generating a modified sample, the modified sample being generated at least in part by modifying a value of the sample using one or more filter coefficients, one or more clipping values of the loop filter, the rounding value, and the shift variable; and outputting the modified sample.

In another illustrative aspect, a non-transitory computer readable medium is provided. The medium comprises instructions that, when executed by one or more processors of a device, cause the device to perform operations comprising obtaining the video data comprising one or more pictures; determining a sample of the one or more pictures to be filtered using a loop filter; determining a shift variable associated with the sample; selecting a rounding value based on the shift variable; generating a modified sample, the modified sample being generated at least in part by modifying a value of the sample using one or more filter coefficients, one or more clipping values of the loop filter, the rounding value, and the shift variable; and outputting the modified sample.

In another illustrative aspect, an apparatus for coding video data is provided. The apparatus comprises: means for obtaining video data comprising one or more pictures; means for determining a sample of the one or more pictures to be filtered using a loop filter; means for determining a shift variable associated with the sample; means for selecting a rounding value based on the shift variable; means for generating a modified sample, the modified sample being generated at least in part by modifying a value of the sample using one or more filter coefficients, one or more clipping values of the loop filter, the rounding value, and the shift variable; and means for outputting the modified sample.

In some aspects, the method, apparatuses, and the non-transitory computer readable medium provided above further comprises determining a position of the sample relative to a virtual boundary associated with the sample and the one or more pictures, wherein the shift variable is based on the position of the sample relative to the virtual boundary.

In some aspects, the sample is a luma picture sample.

In some aspects, the modified sample is a modified filtered reconstructed luma picture sample generated from the one or more clipping values of the loop filter. In some cases, the one or more clipping values are derived from a bitdepth value and a sum value.

In some aspects, the sum value is based on an associated reconstructed luma picture sample and a dynamic offset value.

In some aspects, the rounding value is determined from the shift variable.

In some aspects, the shift variable is determined from a table based on a number of lines from the virtual boundary to the position of the sample.

In some aspects, the sample is a chroma picture sample.

In some aspects, the modified sample is a modified filtered reconstructed chroma picture sample generated from the one or more clipping values of the loop filter. In some cases, one or more clipping values are derived from a bitdepth value and a sum value.

In some aspects, the sum value is based on an associated reconstructed luma picture sample and the rounding value.

In some aspects, the modified sample is output to a display of a device processing the video data.

In some aspects, the modified sample is output to a communication transceiver of a device processing the video data for transmission via a communication network.

In some aspects, the rounding value is adaptively selected based on the shift variable to create symmetrical filtering.

In some aspects, the rounding value is adaptively selected based on the shift variable to weaken a filtering effect for selected pixels near a virtual boundary of a block including the selected pixels.

In some aspects, obtaining the video data and generating the modified sample are performed by processing circuitry of an encoding device.

In some aspects, obtaining the video data and generating the modified sample are performed by processing circuitry of a decoding device.

In another illustrative aspect, an apparatus is provided that includes memory and one or more processors coupled to the memory. The one or more processors are configured to: obtain video data comprising one or more pictures; determine a sample of the one or more pictures to be filtered using a loop filter; determine a shift variable associated with the sample; select a rounding value based on the shift variable; generate a modified sample, the modified sample being generated at least in part by modifying a value of the sample using one or more filter coefficients, one or more clipping values of the loop filter, the rounding value, and the shift variable; and output the modified sample.

In another illustrative aspect, a method of processing video data is provided. The method comprises obtaining the video data comprising one or more pictures; determining a sample of the one or more pictures to be filtered using a loop filter; determining a position of the sample relative to a virtual boundary associated with the sample and the one or more pictures; determining a shift variable based on the position of the sample relative to the virtual boundary; selecting a rounding offset value based on the shift variable; generating a modified sample, the modified sample being generated by modifying a value of the sample using one or more filter coefficients, one or more clipping values of the loop filter, the rounding offset value, and the shift variable; and outputting the modified sample.

In another illustrative aspect, a non-transitory computer readable medium is provided. The medium comprises instructions that, when executed by one or more processors of a device, cause the device to perform operations comprising: obtaining the video data comprising one or more pictures; determining a sample of the one or more pictures to be filtered using a loop filter; determining a position of the sample relative to a virtual boundary associated with the sample and the one or more pictures; determining a shift variable based on the position of the sample relative to the virtual boundary; selecting a rounding offset value based on the shift variable; generating a modified sample, the modified sample being generated by modifying a value of the sample using one or more filter coefficients, one or more clipping values of the loop filter, the rounding offset value, and the shift variable; and outputting the modified sample.

In another illustrative aspect, an apparatus is provided. The apparatus comprises: means for obtaining video data comprising one or more pictures; means for determining a sample of the one or more pictures to be filtered using a loop filter; means for determining a position of the sample relative to a virtual boundary associated with the sample and the one or more pictures; means for determining a shift variable based on the position of the sample relative to the virtual boundary; selecting a rounding offset value based on the shift variable; means for generating a modified sample, the modified sample being generated by modifying a value of the sample using one or more filter coefficients, one or more clipping values of the loop filter, the rounding offset value, and the shift variable; and means for outputting the modified sample.

In some aspects, the modified sample is a modified filtered reconstructed luma picture sample generated from the one or more clipping values of the loop filter generated from a bitdepth value and a sum value. In some cases, the sum value is based on an associated reconstructed luma picture sample and a dynamic offset value. In some cases, the rounding offset value is determined from the shift variable. In some cases, the shift variable is determined from a table based on a number of lines from the virtual boundary to the position of the sample.

In some aspects, the sample is a chroma picture sample. In some cases, the modified sample is a modified filtered reconstructed chroma picture sample generated from the one or more clipping values of the loop filter generated from a bitdepth value and a sum value.

In some aspects, the sum value is based on an associated reconstructed luma picture sample and the rounding offset value.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each example.

The foregoing, together with other features and embodiments, will become more apparent upon referring to the following specification, examples, and accompanying drawings.

BRIEF DESCRIPTION OF THE DRAWINGS

Examples of various implementations are described in detail below with reference to the following figures:

FIG. 7 is a conceptual diagram illustrating an example of a diamond filter shape for CC-ALF, in accordance with some examples;

DETAILED DESCRIPTION

Figure 1:
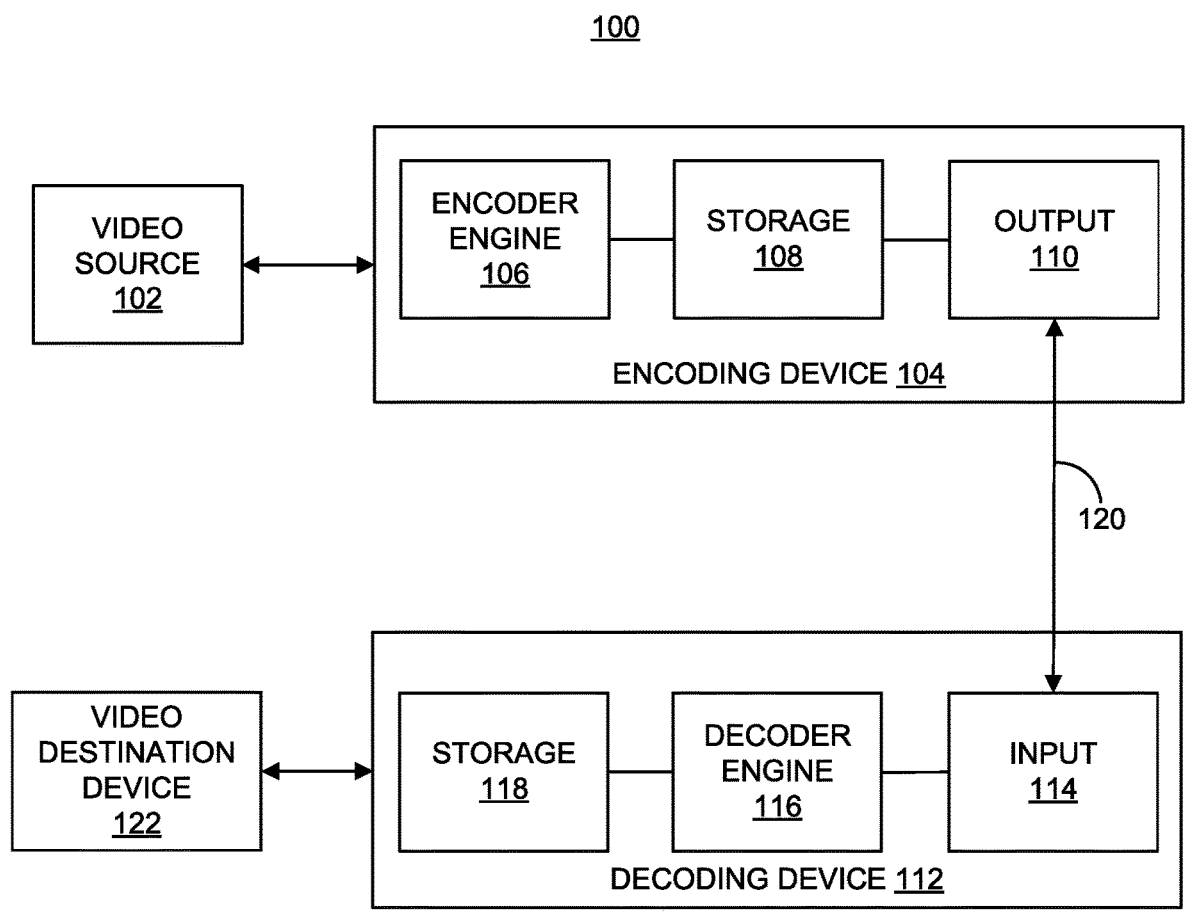
FIG. 1 is a block diagram illustrating an example of an encoding device and a decoding device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Examples described herein describe improvements to loop filtering (e.g., Adaptive Loop Filter (ALF)) implementations. As described herein, loop filters (e.g., ALF filters among other types of loop filters) use a filter pattern to apply filter operations to pixels of images or to classify image data. In some systems, classification is performed on blocks of video data to determine filters to be applied to the video data. Blocks, as described in more detail below, are one level of organizing video data Visual artifacts can occur when filters are applied to the video data, particularly around virtual boundaries associated with data structures (e.g., blocks) used to organize video data. The visual artifacts can be associated with a shift variable related to a distance of a pixel being filtered from a virtual boundary. Application of some filters uses an offset value to compensate for some aspects of filter implementations related to the shift. Such offsets can reduce the strength of the filter (e.g., lower or weaken the filtering effect) to reduce visual artifacts for pixels near virtual boundaries. Examples described herein include adaptive rounding for filter offset values to improve the compensation used for filtering. The adaptive rounding can, in some examples, be based on a distance from a virtual boundary or an associated shift variable. Use of adaptive rounding (e.g., variable offset values) around virtual boundaries improves the operation of coding devices and the performance of video communications in a communication system by reducing visual artifacts created as part of video coding, and improving the video quality generated by a communication system and devices performing and displaying video in video communication and display systems.

In some examples, the use of adaptive rounding for loop filtering can result in symmetrical filtering, where use of a non-adaptive or fixed rounding procedure for loop filtering would result in asymmetrical filtering. Adaptive rounding as described below to generate symmetrical filtering is another aspect of the benefits of examples described herein. Such use of symmetrical filtering, particularly around virtual boundaries as described above, can improve device operations by limiting visual artifacts that can occur during loop filtering around boundaries, providing higher image quality from a coding device.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended examples. While ALF filtering is used herein for illustrative purposes, the techniques described herein can be applied to other types of loop filters, such as Sample Adaptive Offset (SAO) filters, deblocking filters, and/or other types of filters.

Video coding devices can implement video compression techniques to encode and decode video data efficiently. Video compression techniques can include applying different prediction modes, including spatial prediction (e.g., intra-frame prediction or intra-prediction), temporal prediction (e.g., inter-frame prediction or inter-prediction), inter-layer prediction (across different layers of video data and/or other prediction techniques to reduce or remove redundancy inherent in video sequences), among others. A video encoder can partition each picture of an original video sequence into rectangular regions referred to as video blocks or coding units and described in greater detail below. These video blocks can be encoded using a particular prediction mode.

In some cases, video blocks can be divided in one or more ways into one or more groups of smaller blocks. Blocks can include coding tree blocks, prediction blocks, transform blocks, and/or other suitable blocks. References generally to a "block", unless otherwise specified, may refer to such video blocks (e.g., coding tree blocks, coding blocks, prediction blocks, transform blocks, or other appropriate blocks or sub-blocks, as would be understood by one of ordinary skill). These blocks may also interchangeably be referred to herein as "units" (e.g., coding tree unit (CTU), coding unit (CU), prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder can restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder can determine a prediction error. In some examples, the prediction can be determined as the difference between the pixel values in the block being encoded and the predicted block. The prediction error can also be referred to as the residual. The video encoder can also apply a transform to the prediction error (e.g., a discrete cosine transform (DCT) or other suitable transform) to generate transform coefficients. After transformation, the video encoder can quantize the transform coefficients. The quantized transform coefficients and motion vectors can be represented using syntax elements and, along with control information, form a coded representation of a video sequence. In some instances, the video encoder can entropy code syntax elements, thereby further reducing the number of bits used for their representation.

A video decoder can, using the syntax elements and control information discussed above, construct predictive data (e.g., a predictive block) for decoding a current frame. For example, the video decoder can add the predicted block and the compressed prediction error. The video decoder can determine the compressed prediction error by weighting the transform basis functions using the quantized coefficients. The difference between the reconstructed frame and the original frame is called reconstruction error.

The techniques described herein can improve performance of coding devices by improving the quality of video data generated by video coding devices. The improvements described herein are generated by reducing visual artifacts from loop filtering around virtual boundaries and improving associated loop filtering operations. Moreover, the techniques described herein can be applied to any video codecs (e.g., High Efficiency Video Coding (HEVC), Advanced Video Coding (AVC), or other suitable existing video codec), and/or can be an efficient coding tool for any video coding standards, including current video coding standards, video standards being developed, and/or future video coding standards, such as, for example, Versatile Video Coding (VVC), the joint exploration model (JEM), and/or other video coding standards in development or to be developed.

FIG. 1 is a block diagram illustrating an example system 100 including an encoding device 104 and a decoding device 112. The encoding device 104 can be part of a source device, and the decoding device 112 can be part of a receiving device. The source device and/or the receiving device can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, a head-mounted display (HMD), and/or any other suitable electronic device. In some examples, the source device and the receiving device can include one or more wireless transceivers for wireless communications. The coding techniques described herein can apply to video coding in various multimedia applications including, for example, streaming video transmissions (e.g., over the Internet), television broadcasts or transmissions, encoding of digital video for storage on a data storage medium, decoding of digital video stored on a data storage medium, and/or other applications. In some examples, system 100 can support one-way or two-way video transmission to support applications such as video conferencing, video streaming, video playback, video broadcasting, gaming, video telephony, etc.

The encoding device 104 (or encoder) can be used to encode video data using a video coding standard or protocol to generate an encoded video bitstream. Examples of video coding standards include ITU-T H. 261; ISO/IEC MPEG-1 Visual; ITU-T H. 262 or ISO/IEC MPEG-2 Visual; ITU-T H. 263, ISO/IEC MPEG-4 Visual; ITU-T H. 264 (also known as ISO/IEC MPEG-4 AVC), including its Scalable Video Coding (SVC) and Multiview Video Coding (MVC) extensions; and High Efficiency Video Coding (HEVC) or ITU-T H. 265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others).

Various aspects described herein provide examples using the VTM, VVC, HEVC, and/or extensions thereof. However, the techniques and systems described herein can also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 can provide the video data to the encoding device 104. The video source 102 can be part of the source device, or can be part of a device other than the source device. The video source 102 can include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 can include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture can include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. In other instances, a picture may be monochrome and may only include an array of luma samples. A pixel as described herein can refer to a point in a picture that includes luma and chroma samples. A given pixel can, for example, include a luma sample from the S arrays, a Cb chrominance sample, and a Cr chrominance sample.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a Random Access Skipped Leading (RASL) picture flag (e.g., NoRaslOutputFlag) equal to 1. Otherwise, a random access point picture (with RASL flag equal to 0) does not start a CVS.

An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units can contain a sequence of bits forming a coded representation of the video data (e.g., an encoded video bitstream, a CVS of a bitstream, or the like), such as coded representations of pictures in a video. The encoder engine 106 can generate coded representations of pictures by partitioning each picture into multiple slices. A slice can be independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and, in some cases, can be square in shape. For example, a size of a CU can include 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs can be partitioned to be non-square in shape. Syntax data associated with a CU can also describe, for example, partitioning of the CU into one or more TUs according to a CTU. A TU can be square or non-square in shape.

According to the HEVC standard, transformations can be performed using transform units (TUs). TUs may vary for different CUs. The TUs can be sized based on the size of PUs within a given CU. The TUs may be the same size or smaller than the PUs. In some examples, residual samples corresponding to a CU can be subdivided into smaller units using a quadtree structure known as residual quad tree (RQT). Leaf nodes of the RQT may correspond to TUs. Pixel difference values associated with the TUs can be transformed to produce transform coefficients. The transform coefficients can then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode can include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction can be made, for example, at the CU level.

The encoder engine 106 and decoder engine 116 (described in more detail below) can be configured to operate according to VVC. In VVC, a video coder (such as encoder engine 106 and/or decoder engine 116) can partition a picture into a plurality of coding tree units (CTUs). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks can be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an inter-coded I slice), an inter-coded P slice, and/or an inter-coded B slice. An I slice (e.g., intra-frames, independently decodable) is a slice of a picture that is only coded by intra-prediction, and therefore is independently decodable since the I slice requires only the data within the frame to predict any prediction unit or prediction block of the slice. A P slice (e.g., uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (e.g., bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame.

Accuracy of motion vectors can be expressed by the quantization level of the motion vectors. For example, the quantization level can be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 can then perform transformation and quantization. For example, following prediction, the encoder engine 106 can calculate residual values corresponding to the PU. Residual values can include pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block can be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which can be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) can be applied to residual data in each CU. In some examples, a TU can be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples following intra-predictive or inter-predictive coding using PUs of a CU, the encoder engine 106 can calculate residual data for the TUs of the CU. The PUs can include pixel data in the spatial domain (or pixel domain). The TUs can include coefficients in the transform domain following application of a block transform. As previously noted, the residual data may correspond to pixel difference values between pixels of the unencoded picture and prediction values corresponding to the PUs. Encoder engine 106 can form the TUs including the residual data for the CU, and can then transform the TUs to produce transform coefficients for the CU.

The encoder engine 106 can perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream can then be entropy encoded by the encoder engine 106. In some examples, the encoder engine 106 can utilize a predefined scan order to scan the quantized transform coefficients to produce a serialized vector that can be entropy encoded. In some examples, encoder engine 106 can perform an adaptive scan. After scanning the quantized transform coefficients to form a vector (e.g., a one-dimensional vector), the encoder engine 106 can entropy encode the vector. For example, the encoder engine 106 can use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 can send the NAL units making up the encoded video bitstream data over the communications link 120 to the decoding device 112 of the receiving device. The input 114 of the decoding device 112 can receive the NAL units. The communications link 120 can include a channel provided by a wireless network, a wired network, or a combination of a wired and wireless networks. A wireless network can include any wireless interface or combination of wireless interfaces and can include any suitable wireless network (e.g., the Internet or other wide area network, a packet-based network, WiFi™ radio frequency (RF), UWB, WiFi-Direct, cellular, Long-Term Evolution (LTE), WiMax™, or the like). A wired network can include any wired interface (e.g., fiber, ethernet, powerline ethernet, ethernet over coaxial cable, digital signal line (DSL), or the like). The wired and/or wireless networks can be implemented using various equipment and/or components, such as base stations, routers, access points, bridges, gateways, switches, servers, software containers, virtual machines, or the like. The encoded video bitstream data can be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, one or more nodes in a distributed storage system, or any other suitable digital storage media for storing encoded video data.

The input 114 of the decoding device 112 receives the encoded video bitstream data and can provide the video bitstream data to the decoder engine 116, or to storage 118 for later use by the decoder engine 116. The decoder engine 116 can decode the encoded video bitstream data by entropy decoding (e.g., using an entropy decoder) and extracting the elements of one or more coded video sequences making up the encoded video data. The decoder engine 116 can rescale and perform an inverse transform on the encoded video bitstream data. Residual data is passed to a prediction stage of the decoder engine 116. The decoder engine 116 then predicts a block of pixels (e.g., a PU). In some examples, the prediction is added to the output of the inverse transform (the residual data).

The decoding device 112 can output the decoded video to a video destination device 122, which can include a display or other output device for displaying the decoded video data. In some aspects, the video destination device 122 can be part of the receiving device that includes the decoding device 112. In some aspects, the video destination device 122 can be part of a separate device other than the receiving device.

In some examples, the video encoding device 104 and/or the video decoding device 112 can be integrated with an audio encoding device and audio decoding device, respectively. The video encoding device 104 and/or the video decoding device 112 can also include other hardware or software used to implement the coding techniques described herein, such as one or more microprocessors, digital signal processors (DSPs), application-specific integrated circuits (ASICs), field programmable gate arrays (FPGAs), central processing units (CPUs), discrete logic, software, hardware, firmware or any combinations thereof. In some cases, the video encoding device 104 and the video decoding device 112 can be integrated as part of a combined encoder/decoder (codec) in a respective device. An example of specific details of the encoding device 104 is described below with reference to FIG. 10. An example of specific details of the decoding device 112 is described below with reference to FIG. 11.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . , n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture, so that all slices in a picture can refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible piano-stereoscopic 3DTV video format, where the SEI message is carried for every frame of the video, handling of a recovery point SEI message, use of pan-scan scan rectangle SEI message in DVB, in addition to many other examples).

In the field of video coding, filtering can be applied in order to enhance the quality of a decoded video signal. In some cases, the filter can be applied as a post-filter, where a filtered frame is not used for prediction of future frames. In some cases, the filter can be applied as an in-loop filter, where a filtered frame is used to predict future frame. For example, an in-loop filter can filter a picture after reconstruction (e.g., addition of the residual to the prediction) is performed for the picture and before the picture is output and/or before the picture is stored in a picture buffer (e.g., a decoded picture buffer). A filter can be designed, for example, by minimizing the error between the original signal and the decoded filtered signal.

In some cases, adaptive loop filtering is used in video coding to minimize the error (e.g., the mean square error) between original samples and decoded samples by using an adaptive filter, which can be a Wiener-based adaptive filter or other suitable adaptive filter. An adaptive loop filter (ALF) is a loop filter (e.g., for filtering a picture after reconstruction and before being output and/or before being stored in a picture buffer, such as a decoded picture buffer). Loop filters are described below.

In some cases, an adaptive loop filter with clipping can be applied. For instance, in JVET-Q2001-v9, the decoded filter coefficients f(k,l) and clipping values c(k,l) are applied to the reconstructed image R(i,j) as follows:

$$R(i, j) = R(i, j) + \left[ \sum_{k,l=(-K,-K), k,l \neq (0,0)}^{K,K} f(k, l) * clip3(-c(k, l), c(k, l), R(i+k, j+l)) + 64 \right] \gg shift \quad \text{Equation (1)}$$

where shift is 10 or 7 (or other suitable value) depending on the vertical distance between the current sample (i,j) and the virtual boundary. In one illustrative example, if sample (i,j) is on the virtual boundary (e.g., the fourth luma line and the second chroma line above a horizontal CTU boundary in VVC, as illustrated in FIGS. 5B and 5C) or one line above virtual boundary (e.g., the fifth luma line and the third chroma line above a horizontal CTU boundary in VVC, also illustrated in FIGS. 5B and 5C), shift is equal to 10; otherwise, shift is equal to 7. In some examples, a 7×7 filter is applied to luma component (or samples) of pixels, and a 5×5 filter is applied to chroma components of pixels. Examples of such filters are described below, with respect to FIGS. 3A (e.g., a 5×5 filter) and 3B (e.g., a 7×7 filter). Aspects of virtual boundaries are described below with respect to FIGS. 5A, 5B, and 5C.

Figure 2A:
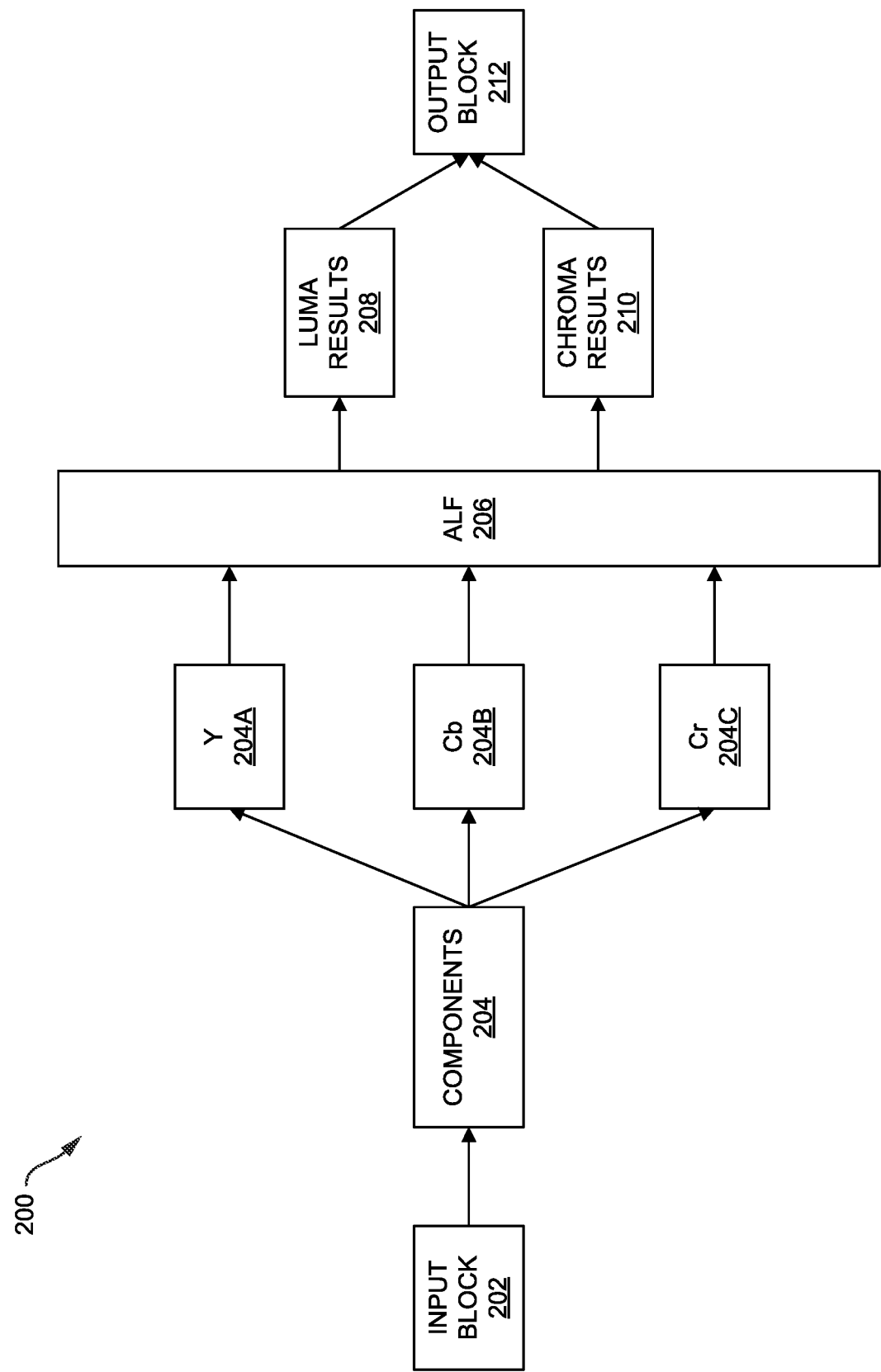
FIG. 2A is a simplified diagram illustrating an example system for applying an adaptive loop filter (ALF), in accordance with some examples of the present disclosure.

FIG. 2A is a simplified diagram illustrating an example system 200 for applying an ALF 206 to an input block 202 in a frame. The block 202 can include color components 204 for image pixels representing the block 202. In the of FIG. 2A example, the color components 204 are in the YCbCr color space and can include luma Y, chroma Cb, and chroma Cr components. The chroma Cb and chroma Cr components in the YCbCr color space can respectively represent the blue-difference and red-difference chroma signals associated with the block 202.

An ALF 206 with ALF filter coefficient values can be applied to luma (Y) component samples 204A, chroma (Cb) component samples 204B, and chroma (Cr) component samples 204C in the block 202. In some examples, the ALF 206 with the ALF filter coefficient values can be applied to samples (e.g., 204A, 204B, 204C) on a block-by-block basis (e.g., to specific video blocks). For example, the video encoder or decoder can process blocks in a frame individually and, when processing a block (e.g., 202) in the frame, the video encoder or decoder can apply ALF filter coefficient from the ALF 206 to that block. The video encoder or decoder can similarly apply ALF filter coefficient values to other blocks as it processes those blocks. In some examples, the ALF 206 can be applied to the luma (Y) component samples 204A, the chroma (Cb) component samples 204B, and the chroma (Cr) component samples 204C to correct artifacts in the block 202, reduce the error between the original frame and the reconstructed frame, and/or increase the quality of the decoded video signal.

Moreover, the ALF 206 can include one or more filters, and each filter can have a specific filter size and shape, as further described below with respect to FIGS. 3A and 3B. For example, the ALF 206 can include a filter of a certain size and shape used for luma (Y) filtering and a filter of a certain size and shape for chroma filtering. As previously explained, in some examples, the ALF 206 can be applied at the block level. For example, in some cases, the ALF 206 can be applied at the CTU or CU level. In other examples, the ALF 206 can be applied at a frame level and/or to other portions of a frame.

A luma filtering result 208 can be obtained from the ALF 206 applied to the luma (Y) component samples 204A. Similarly, a chroma filtering result 210 can be obtained from the ALF 206 applied to the chroma (Cb) component samples 204B and the chroma (Cr) component samples 204C. The luma filtering result 208 can include filtered luma values for the output block 212, and the chroma filtering result 210 can include filtered chroma Cb and chroma Cr values for the output block 212. The output block 212 can include a reconstructed block and/or frame including the luma, chroma Cb and chroma Cr values from the luma filtering result 208 and the chroma filtering result 210. In some cases, the output block 212 along with other output blocks similarly processed can be used to generate a reconstructed frame with ALF filtering.

In some examples, at the encoder side, the luma filtering result 208 and the chroma filtering result 210 can be used to determine whether luma and chroma ALF filtering should be enabled. For example, the quality of the reconstructed block and/or frame after ALF filtering can be compared with the quality of the reconstructed block and/or frame before ALF filtering. ALF filtering can then be enabled or disabled based on the quality of the reconstructed block and/or frame after ALF filtering relative to the quality of the reconstructed block and/or frame before ALF filtering. An ALF flag can then be signaled with the encoded bitstream to indicate whether ALF filtering is enabled or disabled for the block. In some cases, the ALF flag can specify whether luma ALF filtering is enable or disabled, whether luma and chroma ALF filtering are enabled or disabled, or whether ALF filtering is disabled altogether. At the decoder side, the decoder can use the ALF flag to determine whether to perform ALF filtering for the block in the reconstructed image and/or the reconstructed image.

Figure 2B:
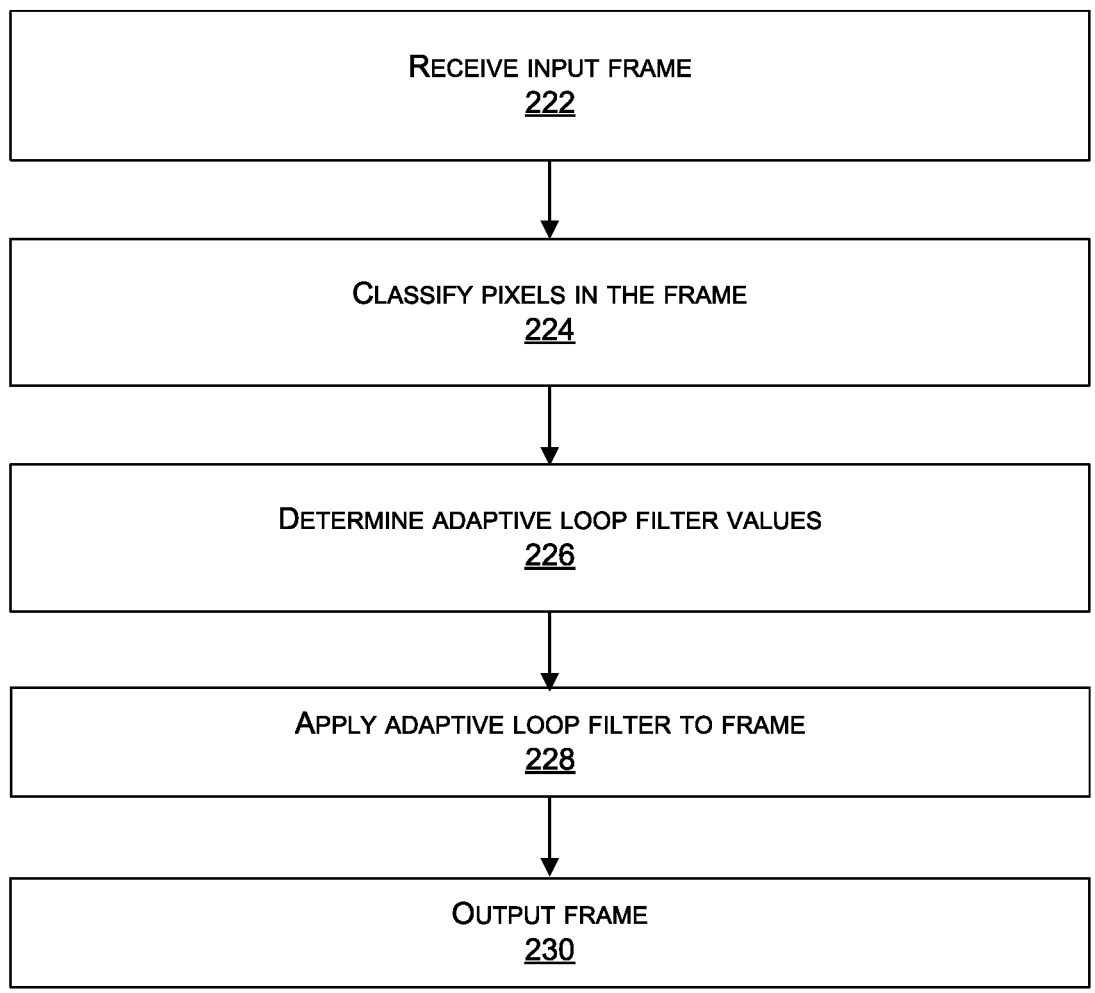
FIG. 2B is a flowchart of an example process for ALF filtering, in accordance with some examples of the present disclosure.

FIG. 2B is a flowchart of an example process 220 for ALF filtering. In various examples, the operations of the process 220 can be performed by an encoding or a decoding device (e.g., a video processing device). In the example of FIG. 2B, at block 222, the video processing device can receive an input frame. The input frame can include color components, such as luma and chroma components, as previously explained. In some examples, the input frame can include blocks in a frame encoded by the encoding device 104 prior to the ALF filtering. In some examples, the input frame can be a frame associated with an image and/or a video sequence.

At block 224, the encoding device 104 can classify luma components in the frame. In some examples, the encoding device 104 can also classify chroma components in the frame. The classification can be applied to a luma component at a block level (e.g., at a 4×4 block level) or at a sample level (for each sample of the frame). In some cases, the classification can include classifying the direction and activity for each block or sample associated with each component in the frame. In some examples, for the luma component, N×N blocks in the whole frame, where N represents a number greater than 0, can be classified based on a 1D Laplacian direction (e.g., up to 5 directions) and 2D Laplacian activity (e.g., up to 5 activity values). In some cases, the encoding device 104 can calculate a direction $Dir_b$ and an unquanitzed activity $Act_b$. In some cases, $Act_b$ can be further quantized to a range of 0 to 4, inclusively.

At block 226, the processing device can determine ALF coefficient values for the ALF, and at block 228, the encoding device 104 can apply the ALF filter to the frame. In some examples, the ALF filter shapes can determine the number of coefficients that will influence the filtering process. Non-limiting example filter shapes can include 5×5, 7×7, and 9×9 diamond shapes. FIGS. 3A and 3B illustrate example ALF filters that can be applied for chroma and luma filtering.

Figures 3A, 3B:
FIG. 3A is a diagram illustrating an example of chroma filter configuration, in accordance with some examples of the present disclosure.
FIG. 3B is a diagram illustrating an example of luma filter configuration, in accordance with some examples of the present disclosure.

With reference to FIG. 3A, an example filter 300 for chroma filtering is shown. The filter 300 is a 5×5 filter and has a diamond shape. The filter 300 includes cells 302 through 326 for 13 input chroma samples. The cells 302 through 326 include coefficient values (e.g., C0 through C6) to be applied to corresponding chroma samples. Each cell (302 through 326) can include a filter coefficient value that is applied to a chroma sample associated with that cell.

With reference to FIG. 3B, an example filter 330 for luma filtering is shown. The filter 330 is a 7×7 filter and has a diamond shape. The filter 330 includes cells 332 through 380 for 25 input luma samples. The cells 332 through 380 include coefficient values (e.g., C0 through C12) to be applied to corresponding luma samples. Each cell (332 through 380) can include a filter coefficient value that is applied to a luma sample associated with that cell.

In some examples, a 5×5 filter, such as filter 300 shown in FIG. 3A can be applied to chroma components, and a 7×7 filter, such as filter 330 shown in FIG. 3B, can be applied to the luma component.

For example, with reference to FIG. 3A, each cell (302 through 326) in the filter 300 can have a filter coefficient f(k, l), and each of these values in the cell can be applied to a corresponding pixel. In some cases, the center of the filter 300 (e.g., cell 314) can be placed on or applied to a pixel and the remaining cells (e.g., cells 302-312 and 316-326) of the filter 300 can be placed on or applied to surrounding or neighboring pixels.

Moreover, with reference to FIG. 3B, each cell (332 through 380) in the filter 330 can have a filter coefficient f(k, l), and each of these values in the cell can be applied to a corresponding pixel. In some cases, the center of the filter 330 (e.g., cell 356), can be placed on or applied to a pixel and the remaining cells (e.g., cells 332-354 and 358-380) of the filter 330 can be placed on or applied to surrounding or neighboring pixels. As described above with respect to the discussion of equation 1 above, when a pixel is being modified with filter values from a loop filter, the proximity to a virtual boundary (e.g., a boundary associated with data storage or availability of nearby pixels in memory available for filtering) can create visual artifacts in video data that degrade video performance. Adaptive rounding operations described herein can provide improved data quality when compared with static offset and rounding.

At block 230, the video processing device can generate an output frame. The output frame can include a reconstructed image after the ALF filtering. The output frame can include pixel values for luma and chroma components, calculated based on the filter coefficients, as previously explained.

In some examples, the pixel values generated for samples by the ALF filtering process 220 can be compared with the pixel values of the original samples to determine whether luma and chroma filtering should be enabled. For example, if the luma filtering results provide better image quality than the unfiltered luma samples, the encoding device 104 can enable luma filtering for the frame. If the chroma filtering results provide better image quality than the unfiltered chroma samples, processing device can enable chroma filtering for the frame.

In some cases, the processing device can signal an ALF flag with an encoded bitstream. The signaled ALF flag can indicate to the processing device whether ALF filtering is enabled or disabled for a particular frame.

Returning to FIG. 2B, when the output frame is generated by an encoding device (e.g., device 104), the image data can be transmitted to a decoding device 112 in an encoded bitstream. The encoded bitstream can include signaling information, as previously explained. The decoding device 112 can receive the encoded bitstream, decode the bitstream, and use the signaling information to apply ALF filtering for frames in the bitstream when such filtering is enabled.

In some cases, values of two diagonal gradients, in addition to the horizontal and vertical gradients used in an existing ALF, can be calculated using a 1D Laplacian. As it can be seen from Equations (2) to (5) below, the sum of gradients of all pixels within an 8×8 window that covers a target pixel can be employed as the represented gradient of the target pixel, where R(k,l) is the reconstructed pixel(s) at location (k,l) and indices i and j refer to the coordinates of the upper-left pixel in the 4×4 block. Each block is associated with four gradient values, with a vertical gradient denoted by $g_v$, a horizontal gradient denoted by $g_h$, a 135 degree diagonal gradient denoted by $g_{d1}$, and a 45 degree diagonal gradient denoted by $g_{d2}$.

$$g_v = \sum_{k=i-2}^{i+3} \sum_{l=j-2}^{j+3} V_{k,l}, \quad \text{Equation (2)}$$

$V_{k,l}=|2R(k,l)-R(k,l-1)-R(k,l+1)|$ when both of k and j are even numbers or both of k and j are not even numbers; 0, otherwise.

$$g_h = \sum_{k=i-2}^{i+3} \sum_{l=j-2}^{j+3} H_{k,l}, \quad \text{Equation (3)}$$

$H_{k,l}=|2R(k,l)-R(k-1,l)-R(k+1,l)|$ when both of k and j are even numbers or both of k and j are not even numbers; 0, otherwise.

$$g_{d0} = \sum_{k=i-2}^{i+3} \sum_{l=j-2}^{j+3} D0_{k,l}, \quad \text{Equation (4)}$$

$D0_{k,l}=|2R(k,l)-R(k-1,l-1)-R(k+1,l+1)|$ when both of k and j are even numbers or both of k and j are not even numbers; 0, otherwise.

$$g_{d1} = \sum_{k=i-2}^{i+3} \sum_{j=j-2}^{j+3} D1_{k,l}, \quad \text{Equation (5)}$$

$D1_{k,l}=|2R(k,l)-R(k-1,l+1)-R(k+1,l-1)|$ when both of k and j are even numbers or both of k and j are not even numbers; 0, otherwise.

To assign the directionality $Dir_b$, the ratio of the maximum and minimum of the horizontal and vertical gradients, denoted by $R_{h,v}$ in Equation (6) below, and the ratio of the maximum and minimum of two diagonal gradients, denoted by $R_{d0,d1}$ in Equation (7) (can also be denoted as $R_{d1,d2}$ in some cases), are compared against each other with two thresholds $t_1$ and $t_2$.

$$R_{h,v}=g_{h,v}^{max}/g_{h,v}^{min} \quad \text{Equation (6)}$$

wherein $g_{h,v}^{max}=\max(g_h,g_v)$, $g_{h,v}^{min}=\min(g_h,g_v)$,
And $$R_{d0,d1}=g_{d0,d1}^{max}/g_{d0,d1}^{min} \quad \text{Equation (7)}$$

wherein $g_{d0,d1}^{max}=\max(g_{d0},g_{d1})$, $g_{d0,d1}^{min}=\min(g_{d0},g_{d1})$ By comparing the detected ratios of the horizontal and vertical gradients and the diagonal gradients, five direction modes (e.g., $Dir_b$ within the range of [0, 4] inclusive), are defined in Equation (8) below. The values of $Dir_b$ and its physical meaning are described in Table 1 below.

$$D = \begin{cases} 0 & R_{h,v} \leq t_1 \ \&\& \ R_{d0,d1} \leq t_1 \\ 1 & R_{h,v} > t_1 \ \&\& \ R_{h,v} > R_{d0,d1} \ \&\& \ R_{h,v} > t_2 \\ 2 & R_{h,v} > t_1 \ \&\& \ R_{h,v} > R_{d0,d1} \ \&\& \ R_{h,v} \leq t_2 \\ 3 & R_{d0,d1} > t_1 \ \&\& \ R_{h,v} \leq R_{d0,d1} \ \&\& \ R_{d0,d1} > t_2 \\ 4 & R_{d0,d1} > t_1 \ \&\& \ R_{h,v} \leq R_{d0,d1} \ \&\& \ R_{d0,d1} \leq t_2 \end{cases} \quad \text{Equation (8)}$$

TABLE 2

Values of Direction and Its Physical Meaning

| Direction Values | Physical Meaning |
| --- | --- |
| 0 | Texture |
| 1 | Strong Horizontal/Vertical |
| 2 | Horizontal/Vertical |
| 3 | Strong Diagonal |
| 4 | Diagonal |

The activity value Act can be calculated as:

$$\text{Act} = \sum_{k=i-3}^{i+4} \sum_{l=j-3}^{j+4} (V_{k,l} + H_{k,l}). \quad \text{Equation (9)}$$

In some cases, the Act value can be further quantized to the range of 0 to 4 inclusive, and the quantized value is denoted as Â. The quantization process from activity value Act to activity index Â is described below.

The quantization process can be defined as follows:

avg_var=Clip_post(NUM_ENTRY−1,
    (Act*ScaleFactor)>>shift);

$$Â=\text{ActivityToIndex}[avg\_var], \quad \text{Equation (10)}$$

where NUM_ENTRY is set to 16 (or other suitable value), ScaleFactor is set to 64 (or other suitable value), shift is (4+internal coded-bitdepth) or other suitable value, ActivityToIndex[NUM_ENTRY]={0, 1, 2, 2, 2, 2, 2, 2, 3, 3, 3, 3, 3, 3, 3, 3, 4} or other suitable set of values, and function Clip_post(a, b) returns the smaller value between a and b.

In total, each 4×4 luma block can be categorized into one out of 25 (5×5) classes and an index is assigned to each 4×4 block according to the value of $Dir_b$ and $Act_b$ of the block. The group index can be denoted as C and can be set equal to $5Dir_b+Â$, where Â is the quantized value of $Act_b$.

Figure 4A:
FIGS. 4A-C are conceptual diagrams illustrating examples of geometry transformations, in accordance with some examples.
Figure 4B:
Figure 4C:

FIGS. 4A-C are conceptual diagrams illustrating examples of geometry transformations, in accordance with some examples. Geometry transformations can be applied in some cases. For each category, one set of filter coefficients and clipping values may be signaled in some cases. To better distinguish different directions of blocks marked with the same category index, four geometry transformations, including no transformation, diagonal transformation, vertical flip transformation, and rotation transformation are introduced. For example, as described above, filter 300 of FIG. 3A is an example of a 5×5 diamond-shaped filter support is shown in FIG. 3A, and the three geometric transformations are depicted in FIGS. 4A, 4B, and 4C. FIG. 4A shows an example of a diagonal transformation 400, where cells illustrated by filter 300 of FIG. 3A are transformed by translating the contents to corresponding cells 402 through 426 of transformation 400. Similarly, FIG. 4B shows an example of a vertical flip transformation 430 with illustrated cells 432 through 456. FIG. 4C shows an example of a rotation transformation 460 with cells 462 through 486. If the diagram from FIG. 3A showing cells of filter 300 are compared to the diagrams in FIG. 4A, FIG. 4B, and FIG. 4C showing the cells of transformations 400, 430, and 460, the following formulaic forms of the three additional geometry transformations can be obtained:

Diagonal: $f_D(k,l)=f(l,k)$, $c_D(k,l)=c(l,k)$,

Vertical flip: $f_V(k,l)=f(k,K-l-1)$, $c_v(k,l)=c(k,K-l-1)$

Rotation: $f_R(k,l)=f(K-l-1,k)$, $c_R(k,l)=c(K-l-1,k)$.    Equation (11)

where K is the size of the filter and $0 \le k,l \le K-1$ are coefficients coordinates, such that location (0,0) is at the upper left corner and location (K−1,K−1) is at the lower right corner. Note that when the diamond filter support is used, such as in the existing ALF, the coefficients with coordinate(s) out of the filter support will be always set to 0. One way of indicating the geometry transformation index is to derive it implicitly to avoid additional overhead. In geometry transformation-based ALF (GALF), the transformations are applied to the filter coefficients f(k,l) depending on gradient values calculated for that block. The relationship between the transformation and the four gradients calculated using Equations (2)-(5) is illustrated in Table 2 below. To summarize, the transformations is based on which one of two gradients (horizontal and vertical, or 45 degree and 135 degree gradients) is larger. Based on the comparison, more accurate direction information can be extracted. Therefore, different filtering results could be obtained due to transformation while the overhead of filter coefficients is not increased.

TABLE 3

Mapping of Gradient and Transformations.

| Gradient values | Transformation |
| --- | --- |
| $g_{d1} < g_{d0}$ and $g_h < g_v$ | No transformation |
| $g_{d1} < g_{d0}$ and $g_v < g_h$ | Diagonal |
| $g_{d0} < g_{d1}$ and $g_h < g_v$ | Vertical flip |
| $g_{d0} < g_{d1}$ and $g_v < g_h$ | Rotation |

Geometry Filter information signaling can be provided in some cases. For example, one luma filter set can contain filter information (e.g., including filter coefficients and clipping values) for all 25 classes.

Fixed filters can be used to predict the filters for each class. A flag can be signaled for each class to indicate whether the class uses a fixed filter as its filter predictor. If yes, the fixed filter information is signaled.

To reduce the number of bits required to represent the filter coefficients, different classes can be merged. The information regarding which classes are merged is provided by sending an index $i_c$ for each of the 25 classes. Classes having the same index $i_c$ share the same filter coefficients that are coded. The mapping between classes and filters is signaled for each luma filter set. The index $i_c$ is coded with truncated binary binarization method.

A signaled filter can be predicted from previously signaled filter. In JVET-Q2001, adaptive parameter sets (APSs) are used to carry ALF filter coefficients in the bitstream. An APS can contain a set of luma filters or a chroma filter or both. A tile group only signals indices of APSs that used for current tile group in its tile group header.

A coding tree block (CTB)-based filter set switch can be implemented in some cases. In JVET-Q2001, filters generated from previously coded tile groups can be used for a current tile group to save the overhead for filter signaling. A luma coding tree block (CTB) can choose a filter set among fixed filter sets and filter sets from APSs. The filter set index can be signaled in or with the bitstream (e.g., in a parameter set, such as PPS, SPS, and/or VPS, in a slice header, in an SEI message in or separate from the bitstream, and/or using other signaling). In some cases, all chroma CTBs use a filter from the same APS. In tile group header, the APSs used for luma and chroma CTBs of current tile group are signaled.

A virtual boundary can be defined in some cases. For instance, to reduce line buffer requirements, 4 lines of luma samples and 2 line of chroma samples can be stored in memory as line buffers. In such an example, the position of a virtual boundary is 4 lines of luma samples and 2 line of chroma samples above each horizontal CTU boundary.

Figure 5A:
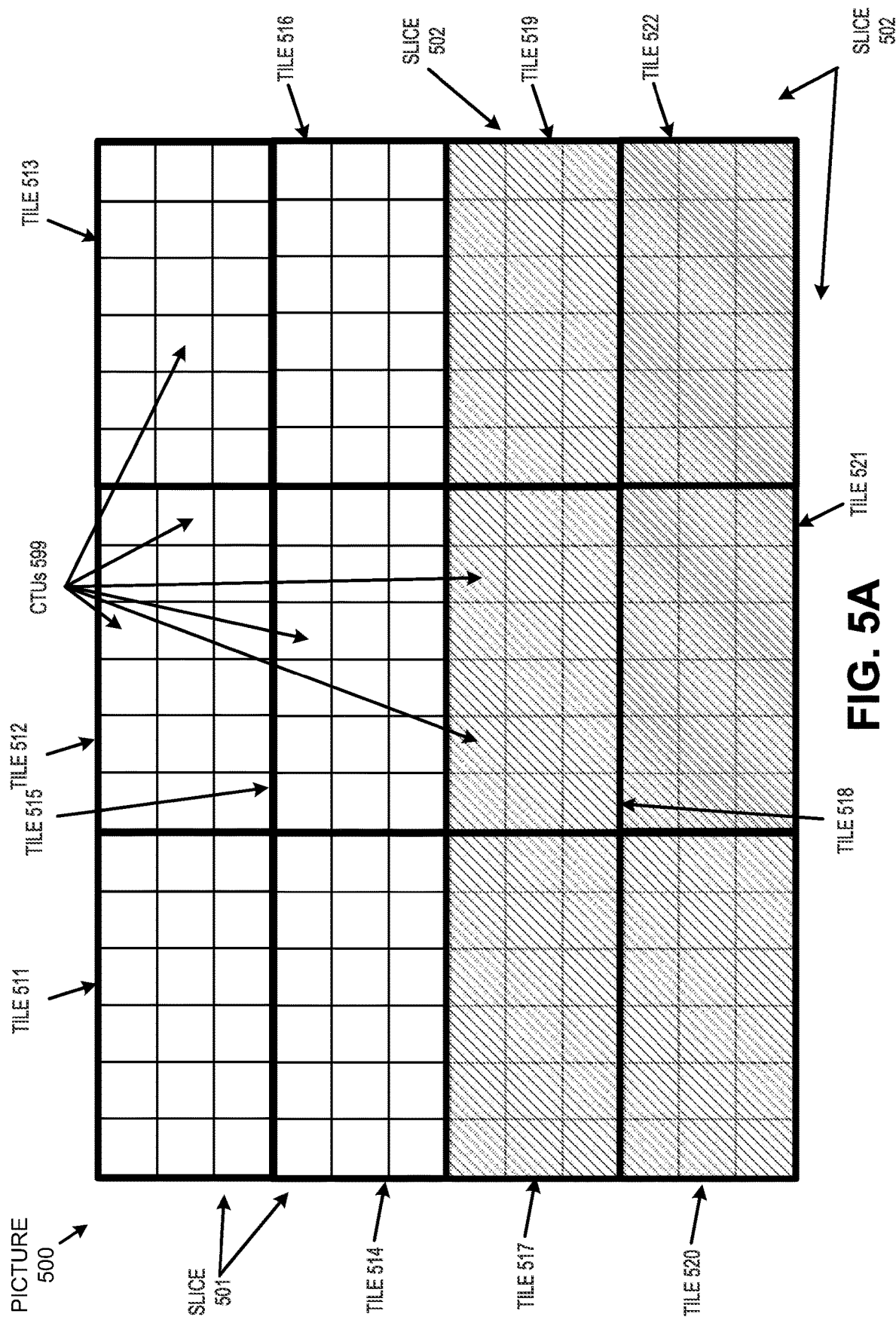
FIG. 5A illustrates aspects of a picture in video data divided by boundaries in accordance with examples described herein.
Figure 5B:
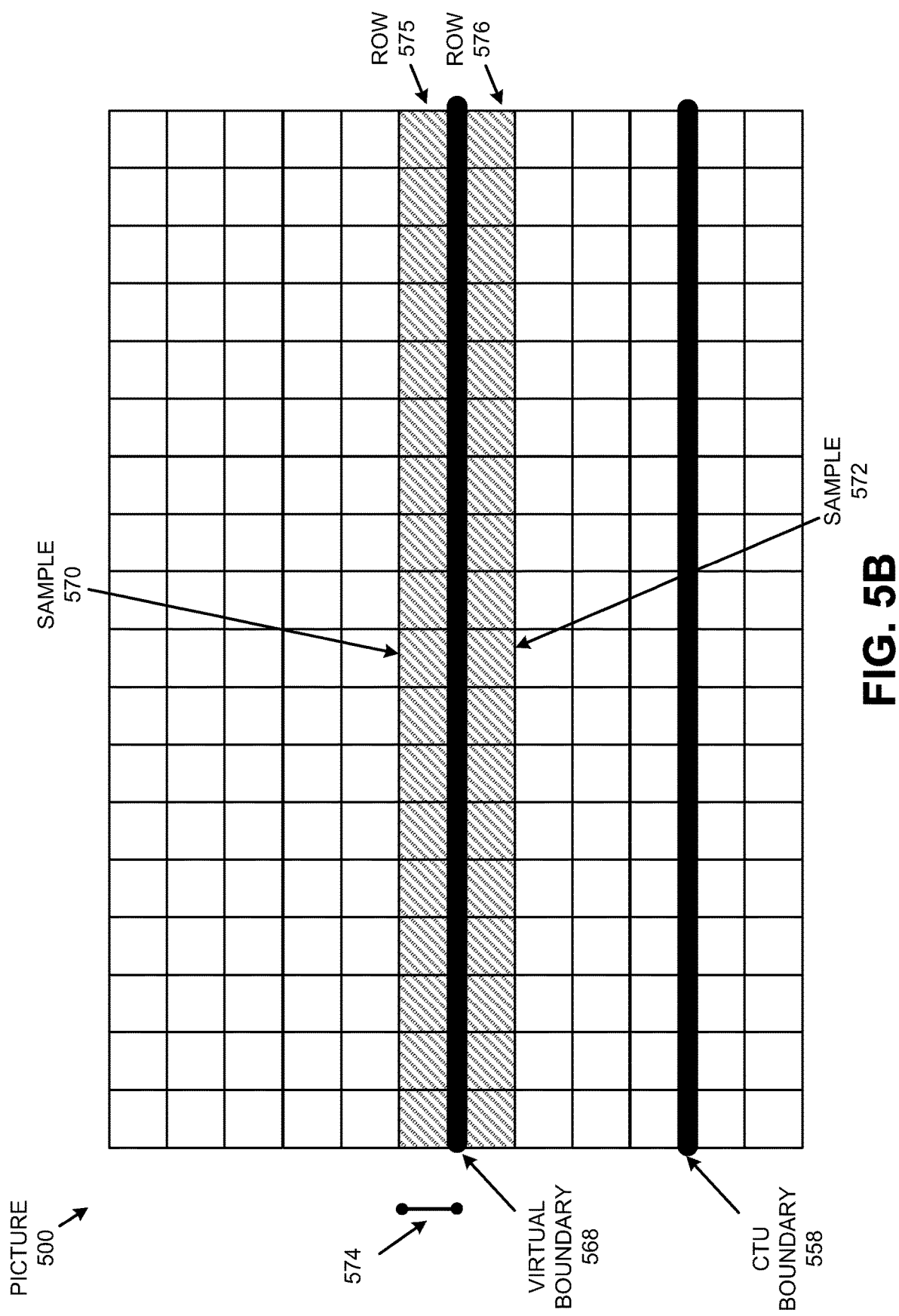
FIG. 5B illustrates aspects of a picture with luma samples of video data divided by a virtual boundary in accordance with some examples.
Figure 5C:
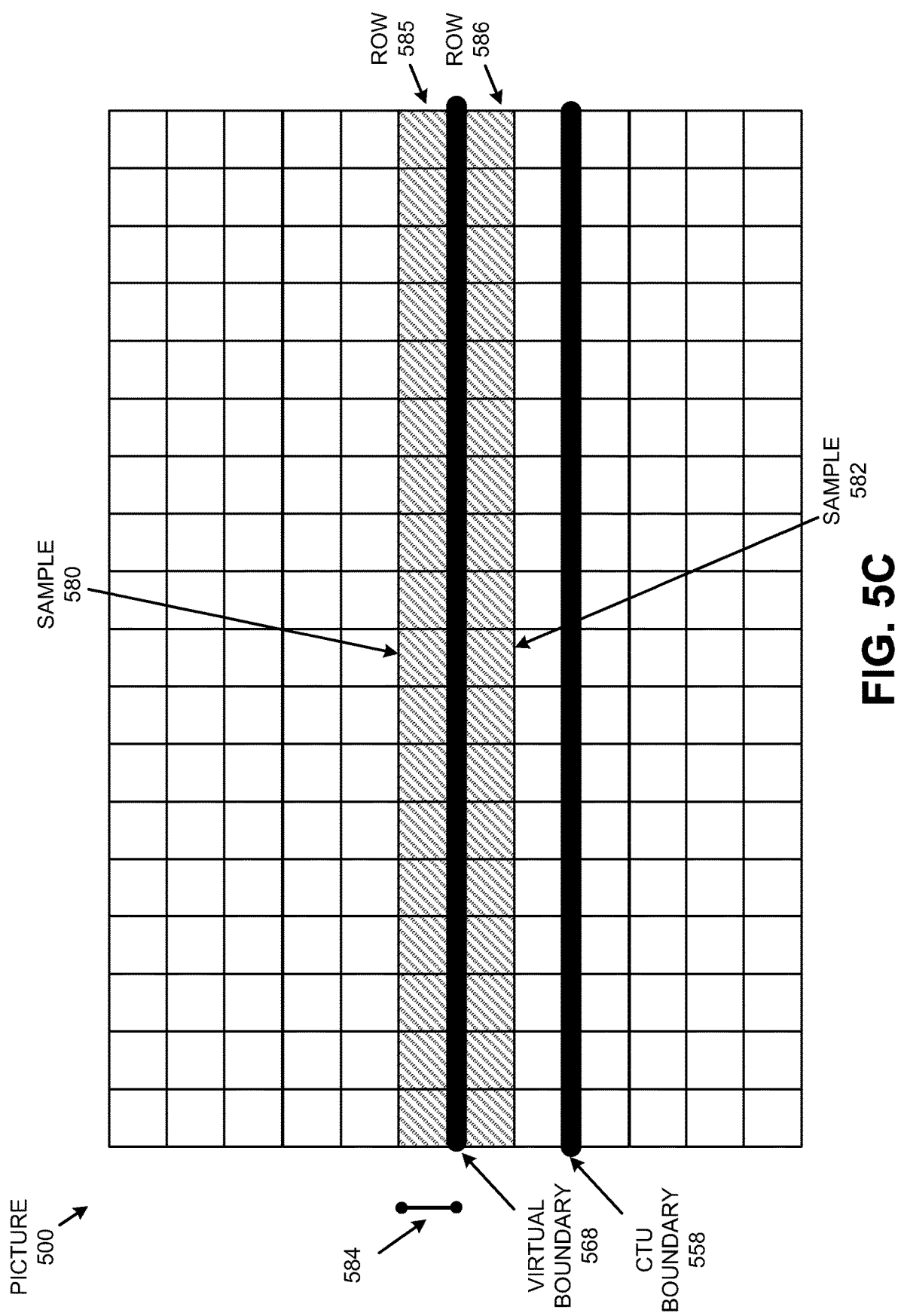
FIG. 5C illustrates aspects of a picture with chroma samples of video data divided by a virtual boundary in accordance with some examples.

FIG. 5A illustrates aspects of a picture in video data divided by boundaries in accordance with examples described herein FIG. 5A is a diagram illustrating a picture 600 which is divided into various elements for coding. As illustrated, picture 600 includes slices 501 and 502, as well as tiles 511, 512, 512, 513, 514, 515, 516, 517, 518, 519, 520, 521, and 522. These 12 tiles each include CTUs 599 (e.g., blocks), and are divided among the illustrated slices.

FIG. 5B illustrates aspects of the picture 500 in video data divided by a virtual boundary, with a pixel to be filtered near the video boundary, in accordance with some examples. FIG. 5B illustrates luma samples. FIG. 5C below illustrates similar aspects of the picture 500 associated with chroma data. Video data can include large amounts of data, sufficient to make aspects of loop filtering inefficient if the filtering is not managed efficiently across related frames (e.g., pictures) of the video data. FIG. 5A illustrates a large number of CTUs as part of larger data structures within the picture 500. FIG. 5B illustrates a small number of cells near a border of an example CTU of the picture 500. As described above, in some cases, a virtual boundary such as the virtual boundary 568 can be defined to assist with operations and memory management during loop filtering. For example, in some implementations, 4 lines of luma samples (e.g., lines between the virtual boundary 568 and the CTU boundary 558) and 2 lines of chroma samples (e.g., lines between the virtual boundary 598 and the CTU boundary 568 in FIG. 5C) about a horizontal CTU boundary are kept as line buffer, since their deblocking filtering cannot be processed until the bottom CTU is available. In example FIG. 5B, cells in the 4 lines between the CTU boundary 558 and the virtual boundary 568 can be associated with such luma samples. Storing such luma samples allows samples in a CTU to be filtered (e.g., using the 5×5 filter of FIG. 3A). For example, the sample 570 is located one line above virtual boundary and the sample 572 is located one line below the virtual boundary 568. Application of a 7×7 filter to the sample 570 would use sample on the other side of the virtual boundary including the sample 572. However, this 7×7 filter cannot be applied to the sample 570 until a deblocking filter and an SAO filter have been applied to the sample 572. Since the deblocking filter and the SAO filter of the sample 572 require the availability of a bottom CTU (e.g., using samples below the CTU boundary 558), the sample 570 needs to be kept in memory as part of an additional line buffer (e.g., for use in processing samples in the same row 576 as sample 572) until processing of the bottom CTU below the CTU boundary 558 is complete. Application of a 7×7 filter to sample 572 would use samples on the other side of the virtual boundary, including the sample 570. However, the 7×7 filter cannot be applied to the sample 572, since associated deblocking and SAO filtering of sample 572 would use unavailable pixel data from the bottom CTU. To avoid extra line buffer resources for ALF, when applying ALF to a sample, samples on the other side of the virtual boundary (e.g., virtual boundary 568) are not utilized. In the example illustrated by FIG. 5B, when filtering sample 570, samples below the virtual boundary 568 (e.g., including the sample 572) are not used. When filtering the sample 572, samples above the virtual boundary 568 (e.g., including the sample 570) are not used. The illustrated example includes a virtual boundary 568 four lines above the illustrated CTU of the picture 500. In other implementations, other virtual boundaries and associated data samples can be stored in memory to facilitate sampling of similar blocks or structures of video data samples. In some examples, the rows on either side of the virtual boundary 568 (e.g., rows 575 and 576) have an associated value of shift of the samples at each row of 10, and the remaining rows (e.g., the unlabeled rows above the row 575 and below the row 576) have associated values of shift of samples of 7. In other examples, other shift values can be used at different distances from the virtual boundary 568.

FIG. 5C illustrates aspects of the picture 500 with chroma samples (e.g., chroma sample 580 and chroma sample 582) of video data divided by the virtual boundary 568 in accordance with some examples. In some examples, the same details described above for the luma data in FIG. 5B are applied for the chroma data of FIG. 5C, with the only change accounting for the difference in samples described above. Due to the sampling difference, distance 584 of FIG. 5C and associated chroma rows 585 and 586 covers a larger portion of the picture 500 than the distance 574 of FIG. 5B and the associated luma rows 575 and 576. In other examples, the number of luma rows stored in the additional line buffer can be greater than the number of chroma rows similarly stored, in order to match the filtering of luma and chroma samples. In still further examples, any filter structure or number of rows can be filtered or used with associated values of shift samples. In the example of FIG. 5C, just as for FIG. 5B above, the rows on either side of the virtual boundary 568 (e.g., the chroma rows 585 and 586) have an associated value of shift of the samples at each row of 10, and the remaining rows (e.g., the unlabeled rows above the rows 585 and 586) have associated values of shift of samples of 7. In other examples, other shift values can be used at different distances (e.g., distances other than the distance 584) from the virtual boundary 568. Similarly, while FIGS. 5B and 5C show the same virtual boundary 568 used for both luma and chroma data, in other examples, the CTU boundary 558 can have different virtual boundaries for luma and chroma data (e.g., instead of the same virtual boundary 568 for both luma and chroma illustrated in FIGS. 5B and 5C).

In addition to the positions and sample 570 described above, FIG. 5B also shows distance 574, which is the vertical distance from sample 570 (e.g., the distance from position 571) to virtual boundary 568. As described further below, in some implementations, an adaptive rounding for loop filtering can be based in part on such a distance. In other examples, other distances (e.g., horizontal, diagonal, etc.) can be used for adaptive rounding to improve device operation and image quality in a video coding system. As described below, shift and offset values associated with sample position can be used to adaptively determine rounding in filtering. The adaptive rounding can operate to weaken a filtering effect (e.g., lower an amount of applied filtering) near virtual boundary 568 to reduce or prevent extreme padding (e.g., use of duplicated sample data for filtering when nearby sample data is not available due to the boundary) and visual artifacts associated with extreme padding. In some examples, this allows for symmetrical filtering that would be asymmetrical in some configurations without the use of adaptive rounding as described herein.

Figure 6:
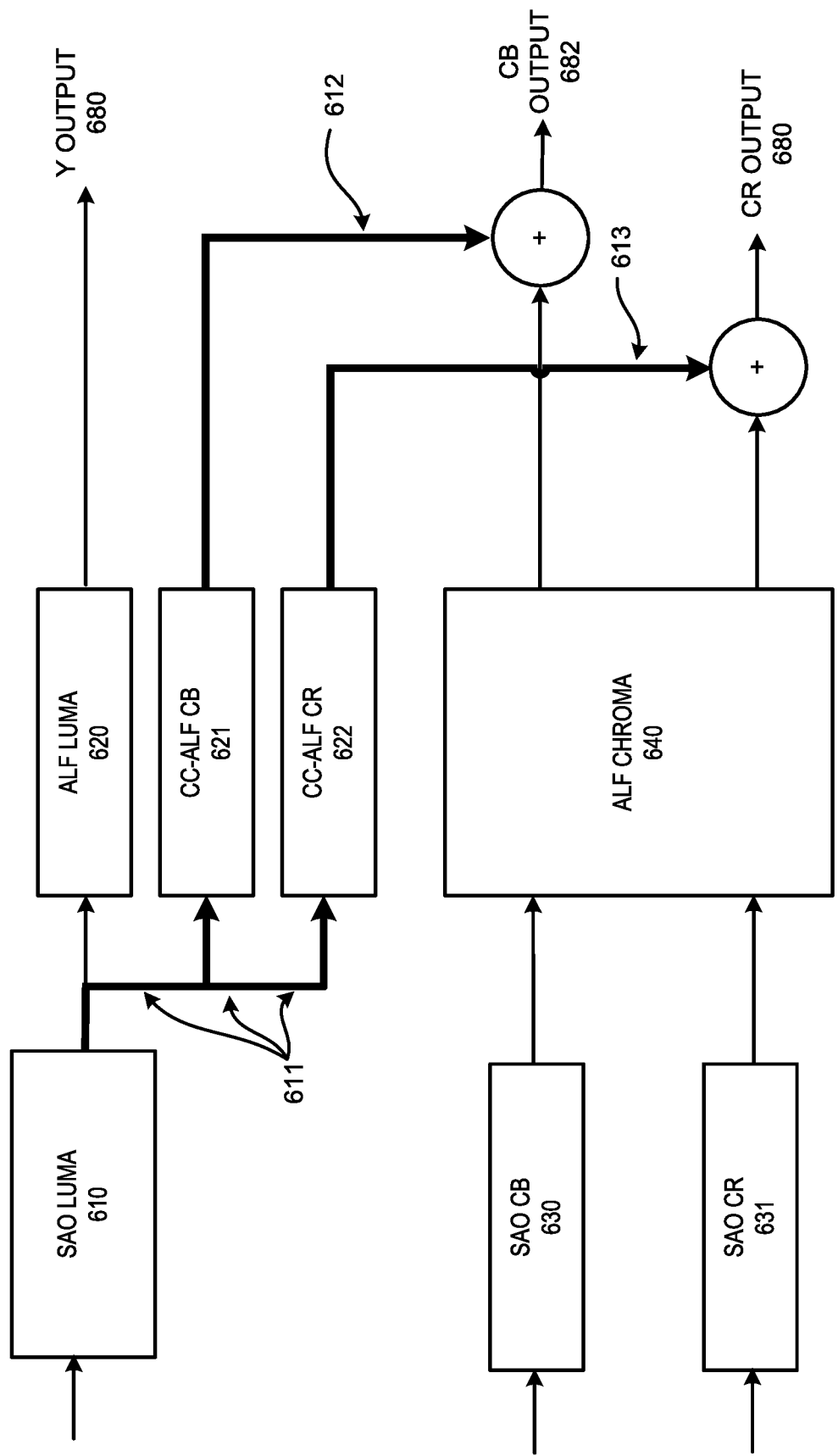
FIG. 6 is a block diagram illustrating an example of placement of CC-ALFs with respect to other loop filters, in accordance with some examples.

FIG. 6 is a block diagram illustrating an example of placement of CC-ALFs with respect to other loop filters, in accordance with some examples. In addition to the above description of virtual boundaries, cross component adaptive loop filters (CC-ALF) can be used in some cases. For example, in JVET-Q2001, the CC-ALF was adopted. The placement of the CC-ALF with respect to other loop filters is illustrated in FIG. 5. The CC-ALF configuration of FIG. 6 includes SAO luma filter 610, SAO Cb filter 630, and SAO Cr filter 631. SAO luma filter 610 provides a signal to three ALF filters. A signal used for Y output 680 is provided to ALF luma filter 620. Cross component signal 611 is provided to CC-ALF Cb filter 621, and CC-ALF Cr filter 622. ALF luma filter 620 provides Y output 680. SAO Cb filter 630 and SOA Cr filter 631 provide inputs to ALF chroma filter 640. The cross component signals 612 from CC-ALF Cb filter 621 is combined with the output of ALF chroma filter 640 to provide cross component based Cb output 682, and the cross component signal 613 from CC-ALF Cr filter 622 is combined with the output from ALF chroma filter 640 to provide Cr output 680. In some examples CC-ALF can use diamond filter shapes different than the filters described above in FIGS. 3A and 3B.

FIG. 7 is a conceptual diagram illustrating an example of a diamond filter 700 for CC-ALF, in accordance with some examples. Similar to the filters above, filter 700 includes cells in a filter pattern shown as cells 702-722. In contrast to the filters of FIGS. 3A and 3B, which are in a diamond pattern symmetrical about both horizontal and vertical lines, the diamond shaped filter 700 of FIG. 7 is only symmetrical around a horizontal line. In other examples of CC-ALF, other filter shapes can be used. In some examples, the output of a CC-ALF can be calculated using Equation (12) as follows:

$$o = \left[\sum_{i=0}^{N-1} (f_i * p_i) + 64\right] \gg 7 \qquad \text{Equation (12)}$$

As the DC neutrality adopted in JVET-Q0165, the output of a CC-ALF can be modified as follows using Equation (13)

$$o = \left[\sum_{i=0 \text{ and } i \neq c}^{N-1} (f_i * (p_i - p_c)) + 64\right] \gg 7 \qquad \text{Equation (13)}$$

where c is the position of collocated luma sample and c=2 in FIG. 7.

As described above, various problems can be present when performing filtering. For example, the rounding offset in equation (1) is the " . . . +64 . . . " portion of the equation. As shown in equation (1), a constant rounding offset (which is 64 in the example of equation (1)) is used for all values of shift. For example, as shown, the value of the rounding offset is 64 regardless of the value of shift. Using a constant rounding offset can cause some inaccuracy and is not consistent with normal rounding that is typically used, especially when the to-be-rounded number is negative.

In another example, in equation (12) and equation (13) shown above for CC-ALF, adaptive shift can be used to align with ALF.

Systems, methods, apparatuses, and computer-readable media are described that are related to ALF and CC-ALF. The techniques described herein can be applied to any of the existing video codecs, such as High Efficiency Video Coding (HEVC), or be proposed as a promising coding tool to the standard currently being developed, such as Versatile Video Coding (VVC), and to other future video coding standards. Any of the techniques described herein can be used individually, or can be used in any combination. JVET-Q2001-v9 is hereby incorporated by reference in its entirety and for all purposes.

In some examples, the rounding offset in equation (1) may be dependent on the value of shift, which can be implemented as in the following illustrative example:

$$\tilde{R}(i, j) = R(i, j) + \left[ \sum_{k,l=(-K,-K), k,l \neq (0,0)}^{K,K} f(k, l) * \text{clip3}(-c(k, l), c(k, l), R(i+k, j+l)) + (1 \ll (\text{shift}-1)) \right] \gg \text{shift} \quad \text{Equation (14)}$$

Each sample of the picture $\tilde{R}(i,j)$ (after filtering) can be referred to herein as a modified sample. In some examples, the following equation from JVET-Q2001-v9 for luma ALF:

$$\text{sum}=\text{curr}+((\text{sum}+64)\gg\text{alfShift}Y) \quad \text{Equation (15)}$$

may be modified as follows:

$$\text{sum}=\text{curr}+((\text{sum}+(1\ll(\text{alfShift}Y-1)))\gg\text{alfShift}Y) \quad \text{Equation (16)}$$

In some examples, the following equation from JVET-Q2001-v9 for chroma ALF:

$$\text{sum}=\text{curr}+((\text{sum}+64)\gg\text{alfShift}C) \quad \text{Equation (17)}$$

may be modified as follows:

$$\text{sum}=\text{curr}+((\text{sum}+(1\ll(\text{alfShift}C-1)))\gg\text{alfShift}C) \quad \text{Equation (18)}$$

In some examples, the right-shifting in equations (11) and (12) above for CC-ALF may be dependent on the position of the center (co-located) luma sample. For instance, equation (12) and equation (13) may be modified as follows:

$$o = \left[ \sum_{i=0}^{N-1} (f_i * p_i) + 64 \right] \gg \text{shift}_{CC-ALF} \quad \text{Equation (19)}$$

and $$o = \left[ \sum_{i=0 \text{ and } i \neq c}^{N-1} (f_i * (p_i - p_c)) + 64 \right] \gg \text{shift}_{CC-ALF} \quad \text{Equation (20)}$$

The following equation from JVET-Q2001-v9:

$$\text{scaledSum}=\text{Clip3}(-(1\ll(\text{BitDepth}-1)),(1\ll(\text{BitDepth}-1))-1,(\text{sum}+64)\gg 7) \quad \text{Equation (21)}$$

may be modified as follows:

$$\text{scaledSum}=\text{Clip3}(-(1\ll(\text{BitDepth}-1)),(1\ll(\text{BitDepth}-1))-1,(\text{sum}+64)\gg\text{shift}_{CC-ALF}) \quad \text{Equation (21)}$$

In some examples as described above, the scaled sum value shown above as scaledSum is used with the Clip3 function, which generates clipped values from the bitdepth value shown as BitDepth and the sum value shown as sum in the above equations. In some examples, the right-shifting and rounding offset for CC-ALF in equations (12) and (13) for CC-ALF may be dependent on the position of the center (co-located) luma sample. For instance, equation (12) and equation (13) may be modified as follows:

$$o = \left[ \sum_{i=0}^{N-1} (f_i * p_i) + (1 \ll (\text{shift}_{CC-ALF} - 1)) \right] \gg \text{shift}_{CC-ALF} \quad \text{Equation (23)}$$

and $$o = \left[ \sum_{i=0 \text{ and } i \neq c}^{N-1} (f_i * (p_i - p_c)) + (1 \ll (\text{shift}_{CC-ALF} - 1)) \right] \gg \text{shift}_{CC-ALF} \quad \text{Equation (24)}$$

The following equation from JVET-Q2001-v9:

$$\text{scaledSum}=\text{Clip3}(-(1\ll(\text{BitDepth}-1)),(1\ll(\text{BitDepth}-1))-1,(\text{sum}+64)\gg 7) \quad \text{Equation (25)}$$

may be modified as follows:

$$\text{scaledSum}=\text{Clip3}(-(1\ll(\text{BitDepth}-1)),(1\ll(\text{BitDepth}-1))-1,(\text{sum}+(1\ll(\text{shift}_{CC-ALF}-1)))\gg\text{shift}_{CC-ALF}) \quad \text{Equation (26)}$$

In some examples, the variable BitDepth (or a value used for the BitDepth variable) can be referred to as a bitdepth value. The variable sum (or a value used for the sum variable) can be referred to as a sum value. Clipped values can be generated by a clipping function, indicated by Clip3 function as illustrated above. In some examples, the value of $\text{shift}_{CC-ALF}$ may be dependent on the vertical distance between center (co-located) luma sample and the virtual boundary. FIG. 5B illustrates an example of such a distance as distance 574, which shows a distance between sample 570 and virtual boundary 568. In one example, $\text{shift}_{CC-ALF}$ for CC-ALF may be the same as luma ALF. When the center luma sample is on the virtual boundary or one line above the virtual boundary (or other number of lines above the virtual boundary), $\text{shift}_{CC-ALF}$ may be equal to 10; otherwise, $\text{shift}_{CC-ALF}$ may be equal to 7. In such examples, Table 47 in JVET-Q2001-v9 may be modified as illustrated in table 4 below:

TABLE 4

Specification of yP1 and yP2 according to the vertical luma
sample position (y * subHeightC) and apply AlfLineBufBoundary

| Condition | shift$_{CC-ALF}$ | yP1 | yP2 |
|---|---|---|---|
| (y * subHeightC == CtbSizeY − 5∥y * subHeightC == CtbSizeY − 4) && apply AlfLineBufBoundary == 1 | 10 | 0 | 0 |
| (y * subHeightC == CtbSizeY − 6∥y * subHeightC == CtbSizeY − 3) && apply AlfLineBufBoundary == 1 | 7 | 1 | 1 |
| Otherwise | 7 | 1 | 2 |

As described above, examples herein can use adaptive rounding for ALF loop filtering. In addition to the examples above, in some implementations, different shift values (e.g., assigned to a shift variable) can be associated with different offset values and associated resulting rounding values other than the specific values described above. For example, in some implementations an offset value of 128 can be used as 128→1.0 with 128>>shift:1 used as a structure for adaptive rounding.

In some examples, without an adjusted offset for adaptive rounding, with a shift of 10 and an offset of 64, positions [−64,0] are associated with a rounding value of 0, and positions with a vertical coordinate less than −64 (e.g., [−65, −66 . . . ] etc.) are associated with a rounding value of 1.0. In such an example, a sample coordinate of [0, 950] would be associated with a rounding value of 0. Such asymmetrical rounding without compensating for the distance from the virtual boundary can result in extreme padding for sample rows adjacent to the virtual boundary. The padding and/or other associated boundary issues related to visual artifacts can be associated with a larger correction value (e.g., 1024 instead of 128) being used with a fixed rounding value of 64. Such correction values with fixed rounding impacts CC-ALF filtering, and with extreme padding in a closest row to a virtual boundary, can result in visual artifacts and reduced video quality. Such artifacts are reduced with adaptive rounding, which can effectively "soften" the filtering applied near virtual boundaries to reduce unwanted visual artifacts with adaptive rounding. The above example and other examples described herein illustrate aspects of adaptive rounding in loop filtering to improve device operation in video coding systems in accordance with the above description.

Figure 8:
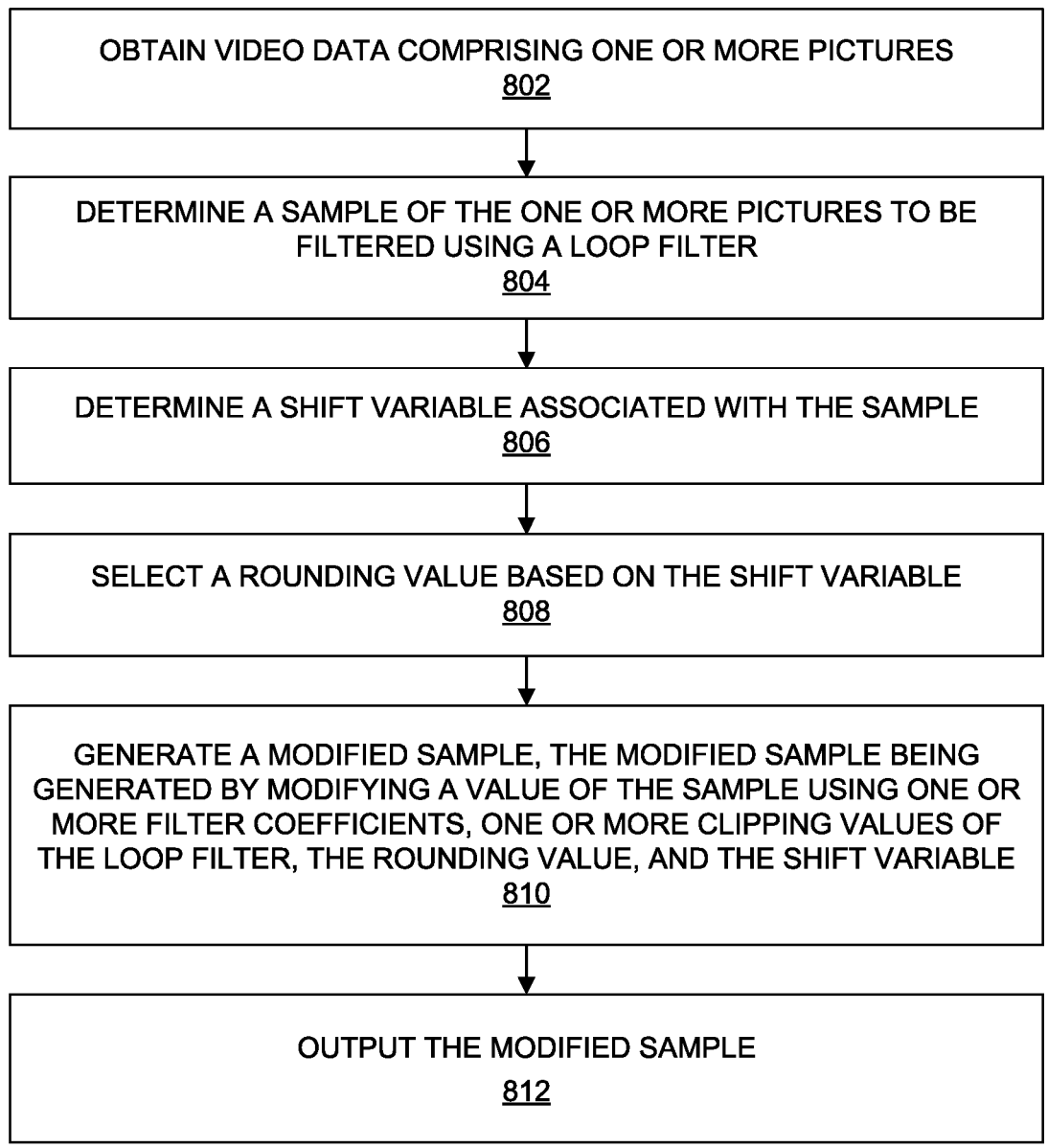
FIG. 8 is a flowchart illustrating an example process for processing video data, in accordance with some examples of the present disclosure.

FIG. 8 is a flowchart illustrating an example process 800 for processing video data, in accordance with some examples of the present disclosure. In some implementations, the process 800 is performed by a coding device comprising a memory and one or more processors coupled to the memory. In some implementations, the process 800 is performed by a device within the system 100, such as encoding device 104 or decoding device 112. In some implementations, the process 800 is implemented as instructions stored in a computer readable storage medium, such that when one or more processors of a coding apparatus processes the instructions, the processors perform the operations of the process 800. In other examples, other implementations are possible.

The process 800 includes operation 802 to obtain the video data comprising one or more pictures. As described above, the video data can include one or more pictures (e.g., picture 500), with samples of the pictures structured in accordance with a video coding standard using associated data structures (e.g., using CTUs 599). In some examples, video data is obtained from a communication process such as a wireless or wired transmission of video data. In some examples, video data is obtained from storage, such as computer memory, optical storage, or other such video data storage.

The process 800 includes operation 804 to determine a sample of the one or more pictures to be filtered using a loop filter. Such a determination can follow additional operations described herein, including classification operations or other such operations. The sample, such as sample 570 of FIG. 5B, will have a position within an associated picture of the video data, and within a threshold distance of a CTU boundary within the associated picture. In some examples, the sample is a luma picture sample. In other examples, the sample can be a chroma picture sample or any other sample type associated with the video data.

The process 800 includes operation 806 to determine a shift variable associated with the sample. As described above, the shift variable can be associated with a distance (e.g., a distance 574) from the sample to a virtual boundary such as virtual boundary. The virtual boundary can be associated with a data structure boundary (e.g., the CTU boundary 558). In the example of FIG. 5B, the virtual boundary 568 is associated with CTU boundary 558 by being positioned 4 luma lines vertically away from CTU boundary 558. In one illustrative example, a virtual boundary can be 2 chroma lines vertically away from a CTU boundary. In other examples, other such associations can be used. In some examples, process 800 further includes determining a position of the sample relative to the virtual boundary associated with the sample and the one or more pictures. In some such examples, the shift variable is based on the position of the sample relative to the virtual boundary (e.g., similar to FIG. 5B, where samples within one row of the virtual boundary 568 are associated with a shift value of 10, and other samples further away are associated with a shift value of 7).

In some examples, the shift variable is calculated from the sample distance to a virtual boundary according to equation 19 and 20 above, or for CC-ALF operations, according to equations 23 and 24, depending on whether the sample is a luma sample or a chroma sample, and according to the specific loop filtering implementation.

The process 800 includes operation 808 to select a rounding offset value based on the shift variable. In some examples, a table stored in memory can be used with the shift variable to select the rounding offset value. Table 4 above is an example of a table that can be used to select a rounding offset value (e.g., 0, 1, or 2) from a shift variable (e.g., 7 or 10). In some examples, the rounding offset value can be calculated from a shift variable.

The process 800 includes operation 810 to generate a modified sample, the modified sample being generated by modifying a value of the sample using one or more filter coefficients, one or more clipping values of the loop filter, the rounding offset value, and the shift variable. In some examples, the rounding value can be determined or derived from the shift variable. In some examples, the shift variable is determined from a table that stores or otherwise indicates a number of lines from the virtual boundary to the position of the sample.

As described above, generation of the modified sample can be considered, in some examples, to use a weakened filtering effect near a virtual boundary. A stronger filtering near the boundary can call on sample data across the boundary that is not available to be used for filtering. When filtering attempts to use such unavailable sample data, padded (e.g., duplicated) pixel data from the available data is used. Because the padded pixel data is not actual data, situations where significant numbers of samples are padded (e.g., referred to as extreme padding) can result in visual artifacts. Weakening or reducing the loop filtering used in some such circumstances by adaptive rounding can limit visual artifacts generated in filtering around boundaries. The use of adaptive rounding can similarly be considered to result in symmetrical filters around boundaries, where non-adaptive filtering can result in application of asymmetrical filters which contribute to visual artifacts around block boundaries. In some such examples, the modified sample can be considered a modified filtered reconstructed luma picture sample generated using the one or more clipping values of the loop filter, wherein the one or more clipping values are derived from a bitdepth value and a sum value (e.g., as used above, for example, in equations 22, 23, 25, and 26). In some examples, the sum value is based on an associated reconstructed luma picture sample and a dynamic offset value.

The process 800 includes operation 812 to output the modified sample. After the modified sample is output, the process 800 can be repeated for each sample of a block (e.g., CTU). Similarly, the process 800 can be repeated wherever identified during coding operations for the video data. The modified sample can also be used for any other coding operations, and can then be used, either for transmission or storage following encoding operations, or for use (e.g., output on a display device) following decoding operations.

In some aspects, the rounding value used in process 800 is adaptively selected based on the shift variable (e.g., the shift value associated with a certain pixel, such as a shift value of 10 or 7 in some examples as described above). In some examples, the rounding variable is adaptively selected based on the shift variable to facilitate weakening of a filter effect for selected pixels (e.g., within a threshold distance) near a virtual boundary associated with a block including the selected pixels. Such a weakening of the filter effect can improve image quality in some circumstances, as described above.

Figure 9:
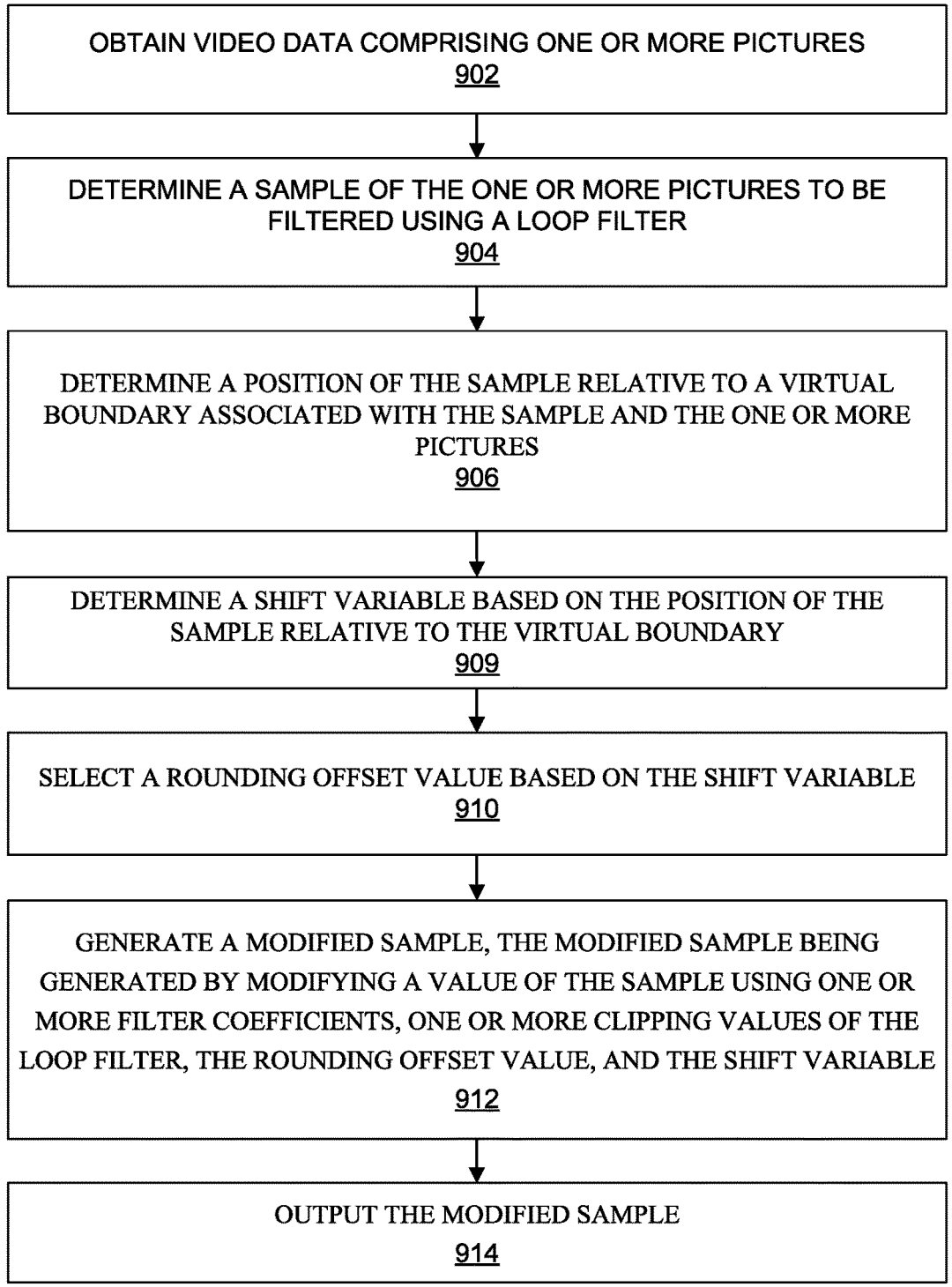
FIG. 9 is a flowchart illustrating an example process for processing video data, in accordance with some examples of the present disclosure.

FIG. 9 is a flowchart illustrating an example process 900 for processing video data, in accordance with some examples of the present disclosure. In some implementations, the process 900 is performed by a coding device comprising a memory and one or more processors coupled to the memory. In some implementations, the process 900 is performed by a device within the system 100, such as encoding device 104 or decoding device 112. In some implementations, the process 900 is implemented as instructions stored in a computer readable storage medium, such that when one or more processors of a coding apparatus processes the instructions, the processors perform the operations of the process 900. In other examples, other implementations are possible.

The process 900 includes operation 902 to obtain the video data comprising one or more pictures. Just as above for process 800, the video data can include one or more pictures (e.g., picture 500), with samples of the pictures structured in accordance with a video coding standard using associated data structures (e.g., using CTUs 599). In some examples, video data is obtained from a communication process such as a wireless or wired transmission of video data. In some examples, video data is obtained from storage, such as computer memory, optical storage, or other such video data storage.

The process 900 includes operation 904 to determine a sample of the one or more pictures to be filtered using a loop filter. The process can repeatedly process multiple samples within the video data, but process 900 is particularly associated with samples close to a virtual boundary and a CTU boundary within the picture (e.g., virtual boundary 568 and CTU boundary 558).

The process 900 includes operation 906 to determine a position of the sample relative to a virtual boundary associated with the sample and the one or more pictures (e.g., distance 574).

The process 900 includes operation 908 to determine a shift variable based on the position of the sample relative to the virtual boundary. For example, in FIG. 5B, samples such as sample 570 and sample 572 within distance 574 (e.g., a distance identifying positions relative to virtual boundary 568) have associated shift variables (e.g., a shift variable of 10) based on their positions relative virtual boundary 568. Other samples above row 575 or below row 576 have different shift variables (e.g., shift values of 7) based on their positions relative to virtual boundary 568.

The process 900 includes operation 910 to select a rounding offset value based on the shift variable. The rounding offset value can, for example, be selected using table 4 above. In other examples of process 900, other methods can be used to select the rounding offset value based on the shift variable for a sample.

The process 900 includes operation 912 to generate a modified sample, the modified sample being generated by modifying a value of the sample using one or more filter coefficients, one or more clipping values of the loop filter, the rounding offset value, and the shift variable.

The process 900 includes operation 914 to output the modified sample. After the modified sample is output, the modified sample can further be used to generate the coded version of a picture within the video data. Such pictures generated by process 900 can then be stored, transmitted, or output to a display depending on the particular application using process 900.

In some examples of process 900, the modified sample is a modified filtered reconstructed luma picture sample generated from the one or more clipping values of the loop filter. In some such examples, the one or more clipping values are derived from a bitdepth value and a sum value and the sum value can be based on an associated reconstructed luma picture sample and a dynamic offset value. In some examples, the rounding offset value is determined from the shift variable. In some examples, the shift variable is determined from a table based on a number of lines from the virtual boundary to the position of the sample. Various examples can be implemented to select the shift variable as described above using table 4 and/or combinations of the equations describing derivation of the inputs used to determine the shift variable and/or other associated variables or values.

In some implementations, the processes (or methods) described herein can be performed by a computing device or an apparatus, such as the system 100 shown in FIG. 1. For example, the processes can be performed by the encoding device 104 shown in FIG. 1 and FIG. 10, by another video source-side device or video transmission device, by the decoding device 112 shown in FIG. 1 and FIG. 11, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing device or apparatus can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming devices, mobile devices, Internet-of-Things (IoT) devices, HMDs, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination devices may access the encoded video data through any standard data connection, including an Internet connection. The access connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC". Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, (e.g., via network transmission). Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 10:
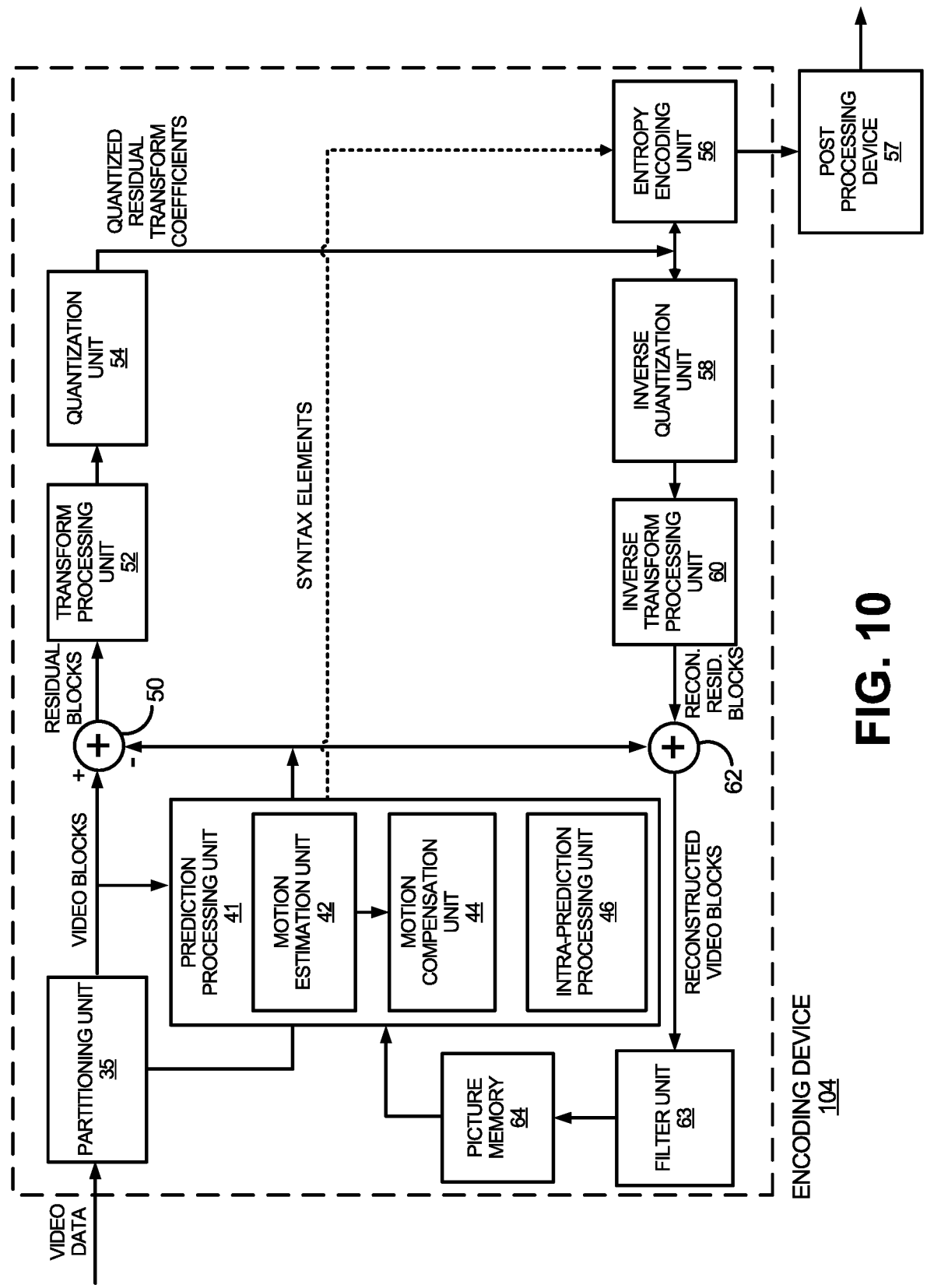
FIG. 10 is a block diagram illustrating an example video encoding device, in accordance with some examples of the present disclosure.
Figure 11:
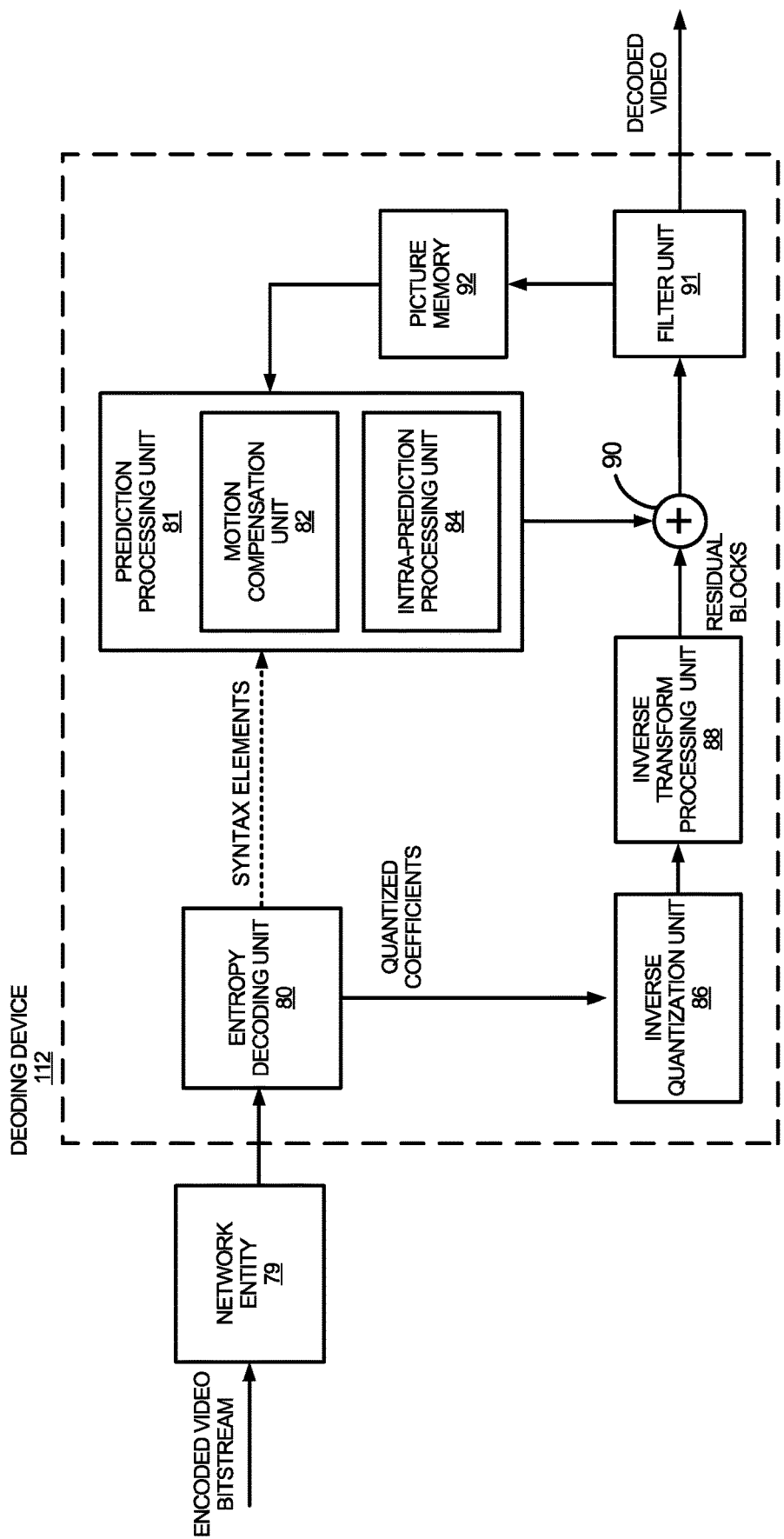
FIG. 11 is a block diagram illustrating an example video decoding device, in accordance with some examples of the present disclosure.

Specific details of the encoding device 104 and the decoding device 112 are shown in FIG. 10 and FIG. 11, respectively. FIG. 10 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 10 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 10, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In some examples, the encoding device 104 of FIG. 10 can represent an example of a video encoder configured to calculate ALF filters with adaptive offsets, performing ALF filtering with adaptively derived offsets or adaptive rounding for loop filters, derive various coding parameters, etc. The encoding device 104 may, for example, calculate ALF filter values using adaptive rounding as described. For instance, the encoding device 104 may perform any of the techniques described herein, including the processes and techniques described above with respect to the figures, or any other process described herein. In some cases, some of the techniques of this disclosure may also be implemented by post processing device 57.

FIG. 11 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 10.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and/or a sample adaptive offset (SAO) filter. Although filter unit 91 is shown in FIG. 11 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In some examples, the decoding device 112 of FIG. 11 represents an example of a video decoder configured to calculate ALF filter values, perform ALF filtering, derive various coding parameters, etc. The decoding device 112 may, for example, calculate ALF filter and clipping values and perform ALF filtering with adaptive rounding or offset determination as described above. For instance, the decoding device 112 may perform any of the techniques described herein, including the including use of the adaptive rounding or adaptive offsets described above.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended examples are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the example. For example, example language reciting "at least one of A and B" means A, B, or A and B. In another example, example language reciting "at least one of A, B, and C" means A, B, C, or A and B, or A and C, or B and C, or A and B and C. The language "at least one of" a set and/or "one or more" of a set does not limit the set to the items listed in the set. For example, example language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of processing video data, the method comprising: determining a sample of a picture to be filtered using a loop filter; generating a modified sample, the modified sample being generated by modifying a value of the sample using one or more filter coefficients and one or more clipping values of the loop filter, a rounding offset, and a shift variable, wherein the rounding offset is dependent on a value of the shift variable; and outputting the modified sample.

Aspect 2. The method of aspect 1, wherein the loop filter is an adaptive loop filter (ALF).

Aspect 3. The method of any one of aspects 1 to 2, further comprising: generating an output picture, the output picture including modified samples generated by modifying values of samples of the picture.

Aspect 4. The method of aspect 3, further comprising: storing the output picture in storage.

Aspect 5. The method of aspect 4, wherein the storage includes a buffer.

Aspect 6. The method of any one of aspects 1 to 5, further comprising: displaying the output picture.

Aspect 7. The method of any one of aspects 1 to 6, further comprising: determining a prediction for the picture by applying a prediction mode to the picture; obtaining a residual for the picture; generating a reconstructed picture by combining the prediction and the residual; and determining the sample from the reconstructed picture.

Aspect 8. An apparatus comprising a memory configured to store video data and a processor configured to process the video data according to any of aspects 1 to 7.

Aspect 9. The apparatus of aspect 8, wherein the apparatus includes an encoder.

Aspect 10. The apparatus of aspect 8, wherein the apparatus includes a decoder.

Aspect 11. The apparatus of any one of aspects 8 to 10, wherein the apparatus is a mobile device.

Aspect 12. The apparatus of any one of aspects 8 to 11, further comprising a display configured to display the video data.

Aspect 13. The apparatus of any one of aspects 8 to 12, further comprising a camera configured to capture one or more pictures.

Aspect 14. A computer readable medium having stored thereon instructions that when executed by a processor perform the methods of any of aspects 1 to 7.

Aspect 15. A method of processing video data, the method comprising: determining a sample of a picture to be filtered using a loop filter; generating a modified sample, the modified sample being generated by modifying a value of the sample using one or more filter coefficients and a shift variable, wherein the shift variable is dependent on a position of a center sample; and outputting the modified sample.

Aspect 16. The method of aspect 15, wherein the loop filter is a cross component adaptive loop filter (CC-ALF).

Aspect 17. The method of any one of aspects 15 to 16, wherein the sample is a luma sample, and wherein the modified sample is a modified luma sample.

Aspect 18. The method of aspect 17, further comprising: combining the modified luma sample with a modified chroma sample.

Aspect 19. The method of any one of aspects 15 to 18, wherein a value of the shift variable is dependent on a vertical distance between the center sample and a virtual boundary of the picture.

Aspect 20. The method of any one of aspects 15 to 19, further comprising: generating an output picture, the output picture including modified samples generated by modifying values of samples of the picture.

Aspect 21. The method of aspect 20, further comprising: storing the output picture in storage.

Aspect 22. The method of aspect 21, wherein the storage includes a buffer.

Aspect 23. The method of any one of aspects 15 to 22, further comprising: displaying the output picture.

Aspect 24. The method of any one of aspects 15 to 23, further comprising: determining a prediction for the picture by applying a prediction mode to the picture; obtaining a residual for the picture; generating a reconstructed picture by combining the prediction and the residual; and determining the sample from the reconstructed picture.

Aspect 25. An apparatus comprising a memory configured to store video data and a processor configured to process the video data according to any of aspects 15 to 24.

Aspect 26. The apparatus of aspect 25, wherein the apparatus includes an encoder.

Aspect 27. The apparatus of aspect 25, wherein the apparatus includes a decoder.

Aspect 28. The apparatus of any one of aspects 25 to 27, wherein the apparatus is a mobile device.

Aspect 29. The apparatus of any one of aspects 25 to 28, further comprising a display configured to display the video data.

Aspect 30. The apparatus of any one of aspects 25 to 29, further comprising a camera configured to capture one or more pictures.

Aspect 31. A computer readable medium having stored thereon instructions that when executed by a processor perform the methods of any of aspects 15 to 24.

Aspect 32. A method of processing video data, the method comprising: determining a sample of a picture to be filtered using a loop filter; generating a modified sample, the modified sample being generated by modifying a value of the sample using one or more filter coefficients, a rounding offset, and a shift variable, wherein the rounding offset and the shift variable are dependent on a position of a center sample; and outputting the modified sample.

Aspect 33. The method of aspect 32, wherein the loop filter is a cross component adaptive loop filter (CC-ALF).

Aspect 34. The method of any one of aspects 32 to 33, wherein the sample is a luma sample, and wherein the modified sample is a modified luma sample.

Aspect 35. The method of aspect 34, further comprising: combining the modified luma sample with a modified chroma sample.

Aspect 36. The method of any one of aspects 32 to 35, wherein a value of the shift variable is dependent on a vertical distance between the center sample and a virtual boundary of the picture.

Aspect 37. The method of any one of aspects 32 to 36, further comprising: generating an output picture, the output picture including modified samples generated by modifying values of samples of the picture.

Aspect 38. The method of aspect 37, further comprising: storing the output picture in storage.

Aspect 39. The method of aspect 38, wherein the storage includes a buffer.

Aspect 40. The method of any one of aspects 21 to 39, further comprising: displaying the output picture.

Aspect 41. The method of any one of aspects 21 to 40, further comprising: determining a prediction for the picture, the predicting including applying a prediction mode to the picture; obtaining a residual for the picture; generating a reconstructed picture by combining the prediction and the residual; and determining the sample from the reconstructed picture.

Aspect 42. An apparatus comprising a memory configured to store video data and a processor configured to process the video data according to any of aspects 32 to 41.

Aspect 43. The apparatus of aspect 42, wherein the apparatus includes an encoder.

Aspect 44. The apparatus of aspect 42, wherein the apparatus includes a decoder.

Aspect 45. The apparatus of any one of aspects 42 to 44, wherein the apparatus is a mobile device.

Aspect 46. The apparatus of any one of aspects 42 to 45, further comprising a display configured to display the video data.

Aspect 47. The apparatus of any one of aspects 42 to 46, further comprising a camera configured to capture one or more pictures.

Aspect 48. A computer readable medium having stored thereon instructions that when executed by a processor perform the methods of any of claims 32 to 41.

Aspect 49. A method of processing video data, the method comprising: obtaining the video data comprising one or more pictures; determining a sample of the one or more pictures to be filtered using a loop filter; determining a shift variable associated with the sample; selecting a rounding value based on the shift variable; generating a modified sample, the modified sample being generated at least in part by modifying a value of the sample using one or more filter coefficients, one or more clipping values of the loop filter, the rounding value, and the shift variable; and outputting the modified sample.

Aspect 50. The method of any one of aspects 49, further comprising determining a position of the sample relative to a virtual boundary associated with the sample and the one or more pictures, wherein the shift variable is based on the position of the sample relative to the virtual boundary.

Aspect 51. The method of any one of aspects 49 to 50, wherein the sample is a luma picture sample.

Aspect 52. The method of aspect 51, wherein the modified sample is a modified filtered reconstructed luma picture sample generated from the one or more clipping values of the loop filter, wherein the one or more clipping values are derived from a bitdepth value and a sum value.

Aspect 53. The method of aspect 52, wherein the sum value is based on an associated reconstructed luma picture sample and a dynamic offset value.

Aspect 54. The method of any one of aspects 49 to 53, wherein the rounding value is determined from the shift variable.

Aspect 55. The method of any one of aspects 49 to 54, wherein the shift variable is determined from a table based on a number of lines from the virtual boundary to the position of the sample.

Aspect 56. The method of any one of aspects 49 to 50 or 53 to 55, wherein the sample is a chroma picture sample.

Aspect 57. The method of any one of aspects 56, wherein the modified sample is a modified filtered reconstructed chroma picture sample generated from the one or more clipping values of the loop filter, wherein the one or more clipping values are derived from a bitdepth value and a sum value.

Aspect 58. The method of aspect 57, wherein the sum value is based on an associated reconstructed luma picture sample and the rounding value.

Aspect 59. The method of any one of aspects 49 to 58, wherein the modified sample is output to a display of a device processing the video data.

Aspect 60. The method of any one of aspects 49 to 59, wherein the modified sample is output to a communication transceiver of a device processing the video data for transmission via a communication network.

Aspect 61. The method of any one of aspects 49 to 60, wherein the rounding value is adaptively selected based on the shift variable to create symmetrical filtering.

Aspect 62. The method of any one of aspects 49 to 61, wherein the rounding value is adaptively selected based on the shift variable to weaken a filtering effect for selected pixels near a virtual boundary of a block including the selected pixels.

Aspect 63. The method of any one of aspects 49 to 62, wherein obtaining the video data and generating the modified sample are performed by processing circuitry of an encoding device.

Aspect 64. The method of any one of aspects 49 to 63, wherein obtaining the video data and generating the modified sample are performed by processing circuitry of a decoding device.

Aspect 65. A method of processing video data, the method comprising: obtaining the video data comprising one or more pictures; determining a sample of the one or more pictures to be filtered using a loop filter; determining a position of the sample relative to a virtual boundary associated with the sample and the one or more pictures; determining a shift variable based on the position of the sample relative to the virtual boundary; selecting a rounding offset value based on the shift variable; generating a modified sample, the modified sample being generated by modifying a value of the sample using one or more filter coefficients, one or more clipping values of the loop filter, the rounding offset value, and the shift variable; and outputting the modified sample.

Aspect 66. The method of aspect 65, wherein the modified sample is a modified filtered reconstructed luma picture sample generated from the one or more clipping values of the loop filter, wherein the one or more clipping values are derived from a bitdepth value and a sum value; wherein the sum value is based on an associated reconstructed luma picture sample and a dynamic offset value; wherein the rounding offset value is determined from the shift variable; and wherein the shift variable is determined from a table based on a number of lines from the virtual boundary to the position of the sample.

Aspect 67. The method of aspect 65, wherein the sample is a chroma picture sample; and wherein the modified sample is a modified filtered reconstructed chroma picture sample generated from the one or more clipping values of the loop filter, wherein the one or more clipping values are derived from a bitdepth value and a sum value.

Aspect 68. The method of aspect 67, wherein the sum value is based on an associated reconstructed luma picture sample and the rounding offset value.

Aspect 69. An apparatus for processing video data comprising: memory; and one or more processors coupled to the memory, the one or more processors being configured to: obtain video data comprising one or more pictures; determine a sample of the one or more pictures to be filtered using a loop filter; determine a shift variable associated with the sample; select a rounding value based on the shift variable; generate a modified sample, the modified sample being generated at least in part by modifying a value of the sample using one or more filter coefficients, one or more clipping values of the loop filter, the rounding value, and the shift variable; and output the modified sample.

Aspect 70. The apparatus of aspect 69, wherein the one or more processors are further configured to: determine a position of the sample relative to a virtual boundary associated with the sample and the one or more pictures, wherein the shift variable is based on the position of the sample relative to the virtual boundary.

Aspect 71. The apparatus any one of aspects 69 to 70 above, wherein the sample is a luma picture sample.

Aspect 72. The apparatus of aspect 71, wherein the modified sample is a modified filtered reconstructed luma picture sample generated from the one or more clipping values of the loop filter, wherein the one or more clipping values are derived from a bitdepth value and a sum value.

Aspect 73. The apparatus of aspect 72, wherein the sum value is based on an associated reconstructed luma picture sample and a dynamic offset value.

Aspect 74. The apparatus of any one of aspects 69 to 73, wherein the rounding value is determined from the shift variable.

Aspect 75. The apparatus of any one of aspects 69 to 74, wherein the shift variable is determined from a table based on a number of lines from the virtual boundary to the position of the sample.

Aspect 76. The apparatus of any one of aspects 69 to 70 or 73 to 75, wherein the sample is a chroma picture sample.

Aspect 77. The apparatus of aspect 76, wherein the modified sample is a modified filtered reconstructed chroma picture sample generated from the one or more clipping values of the loop filter, wherein the one or more clipping values are derived from a bitdepth value and a sum value.

Aspect 78. The apparatus of aspect 77, wherein the sum value is based on an associated reconstructed luma picture sample and the rounding value.

Aspect 79. The apparatus of any one of aspects 69 to 78, wherein the modified sample is output to a display of a device processing the video data.

Aspect 80. The apparatus of any one of aspects 69 to 79, wherein the modified sample is output to a communication transceiver of a device processing the video data for transmission via a communication network.

Aspect 81. The apparatus of any one of aspects 69 to 80, wherein the rounding value is adaptively selected based on the shift variable to create symmetrical filtering.

Aspect 82. The apparatus of any one of aspects 69 to 81, wherein the rounding value is adaptively selected based on the shift variable to weaken a filtering effect for selected pixels near a virtual boundary of a block including the selected pixels.

Aspect 83. The apparatus of any one of aspects 69 to 82, wherein the apparatus includes processing circuitry of an encoding device.

Aspect 84. The apparatus of any one of aspects 69 to 83, wherein the apparatus includes processing circuitry of a decoding device.

Aspect 85. An apparatus for processing video data comprising: memory; and one or more processors coupled to the memory, the one or more processors being configured to: obtain the video data comprising one or more pictures; determine a sample of the one or more pictures to be filtered using a loop filter; determine a position of the sample relative to a virtual boundary associated with the sample and the one or more pictures; determine a shift variable based on the position of the sample relative to the virtual boundary; select a rounding offset value based on the shift variable; generate a modified sample, the modified sample being generated by modifying a value of the sample using one or more filter coefficients, one or more clipping values of the loop filter, the rounding offset value, and the shift variable; and output the modified sample.

Aspect 86. The apparatus of aspect 85, wherein the modified sample is a modified filtered reconstructed luma picture sample generated from the one or more clipping values of the loop filter, wherein the one or more clipping values are derived from a bitdepth value and a sum value; wherein the sum value is based on an associated reconstructed luma picture sample and a dynamic offset value; wherein the rounding offset value is determined from the shift variable; and wherein the shift variable is determined from a table based on a number of lines from the virtual boundary to the position of the sample.

Aspect 87. The apparatus of aspect 85, wherein the sample is a chroma picture sample; and wherein the modified sample is a modified filtered reconstructed chroma picture sample generated from the one or more clipping values of the loop filter, wherein the one or more clipping values are derived from a bitdepth value and a sum value.

Aspect 88. The apparatus of aspect 87, wherein the sum value is based on an associated reconstructed luma picture sample and the rounding offset value.

Aspect 89. An apparatus comprising means for performing operations according to any of aspects 1 to 88.

Aspect 90. A non-transitory computer-readable storage medium comprising instructions stored thereon which, when executed by one or more processors, cause the one or more processors to perform operations according to any of aspects 1 to 88.

What is claimed is:

1. A method of processing video data, the method comprising:
   obtaining the video data comprising one or more pictures;
   determining a sample of the one or more pictures to be filtered using a loop filter;
   determining a shift variable associated with the sample;
   selecting a rounding value based on the shift variable;
   generating a modified sample, the modified sample being generated at least in part by modifying a value of the sample using one or more filter coefficients, one or more clipping values of the loop filter, the rounding value, and the shift variable; and
   outputting the modified sample.

2. The method of claim 1, further comprising determining a position of the sample relative to a virtual boundary associated with the sample and the one or more pictures, wherein the shift variable is based on the position of the sample relative to the virtual boundary.

3. The method of claim 2, wherein the sample is a luma picture sample.

4. The method of claim 3, wherein the modified sample is a modified filtered reconstructed luma picture sample generated from the one or more clipping values of the loop filter derived from a bitdepth value and a sum value.

5. The method of claim 4, wherein the sum value is based on an associated reconstructed luma picture sample and a dynamic offset value.

6. The method of claim 5, wherein the rounding value is determined from the shift variable.

7. The method of claim 6, wherein the shift variable is determined from a table based on a number of lines from the virtual boundary to the position of the sample.

8. The method of claim 2, wherein the sample is a chroma picture sample.

9. The method of claim 8, wherein the modified sample is a modified filtered reconstructed chroma picture sample generated from the one or more clipping values of the loop filter derived from a bitdepth value and a sum value.

10. The method of claim 9, wherein the sum value is based on an associated reconstructed luma picture sample and the rounding value.

11. The method of claim 1, wherein the modified sample is output to a display of a device processing the video data.

12. The method of claim 1, wherein the modified sample is output to a communication transceiver of a device processing the video data for transmission via a communication network.

13. The method of claim 1, wherein the rounding value is adaptively selected based on the shift variable to create symmetrical filtering.

14. The method of claim 1, wherein the rounding value is adaptively selected based on the shift variable to weaken a filtering effect for selected pixels near a virtual boundary of a block including the selected pixels.

15. The method of claim 1, wherein obtaining the video data and generating the modified sample are performed by processing circuitry of an encoding device.

16. The method of claim 1, wherein obtaining the video data and generating the modified sample are performed by processing circuitry of a decoding device.

17. A method of processing video data, the method comprising:
- obtaining the video data comprising one or more pictures;
- determining a sample of the one or more pictures to be filtered using a loop filter;
- determining a position of the sample relative to a virtual boundary associated with the sample and the one or more pictures;
- determining a shift variable based on the position of the sample relative to the virtual boundary;
- selecting a rounding offset value based on the shift variable;
- generating a modified sample, the modified sample being generated by modifying a value of the sample using one or more filter coefficients, one or more clipping values of the loop filter, the rounding offset value, and the shift variable; and
- outputting the modified sample.

18. The method of claim 17, wherein the modified sample is a modified filtered reconstructed luma picture sample generated from the one or more clipping values of the loop filter, wherein the one or more clipping values are derived from a bitdepth value and a sum value;
- wherein the sum value is based on an associated reconstructed luma picture sample and a dynamic offset value;
- wherein the rounding offset value is determined from the shift variable; and
- wherein the shift variable is determined from a table based on a number of lines from the virtual boundary to the position of the sample.

19. The method of claim 17, wherein the sample is a chroma picture sample; and
- wherein the modified sample is a modified filtered reconstructed chroma picture sample generated from the one or more clipping values of the loop filter, wherein the one or more clipping values are derived from a bitdepth value and a sum value.

20. The method of claim 19, wherein the sum value is based on an associated reconstructed luma picture sample and the rounding offset value.

21. An apparatus comprising:
- memory; and
- one or more processors coupled to the memory, the one or more processors being configured to:
  - obtain video data comprising one or more pictures;
  - determine a sample of the one or more pictures to be filtered using a loop filter;
  - determine a shift variable associated with the sample;
  - select a rounding value based on the shift variable;
  - generate a modified sample, the modified sample being generated at least in part by modifying a value of the sample using one or more filter coefficients, one or more clipping values of the loop filter, the rounding value, and the shift variable; and
  - output the modified sample.

22. The apparatus of claim 21, wherein the one or more processors are further configured to:
- determine a position of the sample relative to a virtual boundary associated with the sample and the one or more pictures, wherein the shift variable is based on the position of the sample relative to the virtual boundary.

23. The apparatus of claim 22, wherein the sample is a luma picture sample.

24. The apparatus of claim 23, wherein the modified sample is a modified filtered reconstructed luma picture sample generated from the one or more clipping values of the loop filter, wherein the one or more clipping values are derived from a bitdepth value and a sum value.

25. The apparatus of claim 24, wherein the sum value is based on an associated reconstructed luma picture sample and a dynamic offset value.

26. The apparatus of claim 25, wherein the rounding value is determined from the shift variable; and
- wherein the shift variable is determined from a table based on a number of lines from the virtual boundary to the position of the sample.

27. The apparatus of claim 22, wherein the sample is a chroma picture sample.

28. The apparatus of claim 27, wherein the modified sample is a modified filtered reconstructed chroma picture sample generated from the one or more clipping values of the loop filter, and wherein the one or more clipping values are derived from a bitdepth value and a sum value.

29. The apparatus of claim 28, wherein the sum value is based on an associated reconstructed luma picture sample and the rounding value.

30. A non-transitory computer-readable storage medium comprising instructions stored thereon which, when executed by one or more processors, cause the one or more processors to:
- obtain video data comprising one or more pictures;
- determine a sample of the one or more pictures to be filtered using a loop filter;
- determine a shift variable associated with the sample;
- select a rounding value based on the shift variable;
- generate a modified sample, the modified sample being generated at least in part by modifying a value of the sample using one or more filter coefficients, one or more clipping values of the loop filter, the rounding value, and the shift variable; and
- output the modified sample.

* * * * *